US009283632B2

(12) United States Patent
Sonoda et al.

(10) Patent No.: US 9,283,632 B2
(45) Date of Patent: Mar. 15, 2016

(54) TAPPING MACHINE AND TAP DIE, AND METHOD OF DETECTING OVERSTROKE OF TAP

(75) Inventors: Nobuhisa Sonoda, Kanagawa (JP); Shingo Arai, Kanagawa (JP); Junichi Asami, Kanagawa (JP)

(73) Assignee: AMADA COMPANY, LIMITED, Kanagawa (JP)

( * ) Notice: Subject to any disclaimer, the term of this patent is extended or adjusted under 35 U.S.C. 154(b) by 1300 days.

(21) Appl. No.: 13/002,690

(22) PCT Filed: Jul. 7, 2009

(86) PCT No.: PCT/JP2009/062347
§ 371 (c)(1),
(2), (4) Date: Jan. 5, 2011

(87) PCT Pub. No.: WO2010/004980
PCT Pub. Date: Jan. 14, 2010

(65) Prior Publication Data
US 2011/0116881 A1    May 19, 2011

(30) Foreign Application Priority Data

Jul. 8, 2008   (JP) .................................. 2008-178029
Sep. 17, 2008  (JP) .................................. 2008-238289
Sep. 17, 2008  (JP) .................................. 2008-238293

(51) Int. Cl.
*B23G 1/08*    (2006.01)
*B23G 3/00*    (2006.01)
(Continued)

(52) U.S. Cl.
CPC ................ *B23G 3/005* (2013.01); *B21D 28/26* (2013.01); *B21D 28/36* (2013.01); *B23G 1/08* (2013.01); *B23G 2240/52* (2013.01); *Y10T 74/19* (2015.01); *Y10T 74/19651* (2015.01); *Y10T 408/03* (2015.01); *Y10T 408/65* (2015.01); *Y10T 408/89* (2015.01)

(58) Field of Classification Search
CPC .......... B21D 28/26; B21D 28/36; B23G 1/08; B23G 3/005
USPC ......................................................... 408/124
See application file for complete search history.

(56) References Cited

U.S. PATENT DOCUMENTS 2,715,233 A * 8/1955 Clark .............................. 408/56
3,193,859 A * 7/1965 Pfister ........................... 408/124
(Continued)

FOREIGN PATENT DOCUMENTS

JP    61050705 A  *  3/1986  ............. B23B 39/16
JP    4-53626         2/1992
(Continued)

OTHER PUBLICATIONS

Japan Office action, mail date is Mar. 5, 2013.
(Continued)

*Primary Examiner* — Eric A Gates
(74) *Attorney, Agent, or Firm* — Greenblum & Bernstein, P.L.C.

(57) ABSTRACT

An adapter for tapping used in a turret punch press includes a ring gear in which a tapping tool is mountable. Further, a gear holder in which the ring gear is disposed and which is mountable on a turret of the turret punch press so as to locate the disposed ring gear at a position corresponding to a punch mounting section formed in advance in the turret of the turret punch press is also provided.

1 Claim, 20 Drawing Sheets

(51) Int. Cl.
   *B21D 28/26*   (2006.01)
   *B21D 28/36*   (2006.01)

(56) References Cited

U.S. PATENT DOCUMENTS

| | | | |
|---|---|---|---|
| 3,788,760 A * | 1/1974 | Daniels | 408/130 |
| 4,658,688 A * | 4/1987 | Shah et al. | 83/552 |
| 4,692,072 A * | 9/1987 | Pfister et al. | 408/124 |
| 4,706,369 A * | 11/1987 | Lavorel | 29/560 |
| 4,761,100 A * | 8/1988 | Maillard | 408/1 R |
| 5,001,827 A * | 3/1991 | Nakagawa | 29/560 |
| 5,168,610 A * | 12/1992 | Ichimura et al. | 29/33 J |
| 5,615,471 A * | 4/1997 | Perazzolo | 29/560 |
| 7,559,727 B2 | 7/2009 | Kouno et al. | |
| 7,597,512 B2 | 10/2009 | Kouno et al. | |

FOREIGN PATENT DOCUMENTS

| | | | | |
|---|---|---|---|---|
| JP | 06126532 A * | 5/1994 | | B23G 3/00 |
| JP | 06126533 A * | 5/1994 | | B23G 3/00 |
| JP | 06218625 A * | 8/1994 | | B23G 3/00 |
| JP | 9-29357 | 2/1997 | | |
| JP | 9-47917 | 2/1997 | | |
| JP | 09108942 A * | 4/1997 | | |
| JP | 09267137 A * | 10/1997 | | B21D 28/36 |
| JP | 10-109225 | 4/1998 | | |
| JP | 10-244327 | 9/1998 | | |
| JP | 2000-288835 | 10/2000 | | |
| JP | 2001232518 A * | 8/2001 | | |
| JP | 2004-268247 | 9/2004 | | |
| JP | 2004-337921 | 12/2004 | | |
| JP | 2007-75889 | 3/2007 | | |
| JP | 2008055433 A * | 3/2008 | | |
| JP | 2010017763 A * | 1/2010 | | |
| JP | 2010017797 A * | 1/2010 | | |
| SU | 1430196 A1 * | 10/1988 | | |

OTHER PUBLICATIONS

Japan Office action, mail date is Apr. 10, 2012.

* cited by examiner (a)

(b)

(a)

(b)

(a)

(b)

(a)

(b)

(c)

(a)

(b)

(c)

TAPPING MACHINE AND TAP DIE, AND METHOD OF DETECTING OVERSTROKE OF TAP

TECHNICAL FIELD

The present invention relates to a tapping machine, a die, and a method of detecting overstroke of a tap, and specifically to: an adapter for tapping disposed and used in a turret punch press; a tapping tool; a tap die capable of improving a discharge performance of chips generated at the time of tapping; a method of detecting overstroke of a tap when the tap's stroke reaches or exceeds a predetermined stroke length; and a tap die used for the method.

BACKGROUND ART

A conventional turret punch press performs punching and press working by using punches and dies.

In the meantime, due to increasing diversity and complexity in the shapes of workpieces in recent years, there is a growing demand for performing not only various types of punching but also various types of tapping on works by use of a single turret punch press.

The above-mentioned technique has been disclosed in Patent Document 1 and Patent Document 2, for example.

Incidentally, in a conventional turret punch press, mounting sections (mounting sections for tools) provided to a turret are designed as mounting sections dedicated for punches or mounting sections dedicated for tapping tools, and the punching tools and the tapping tools are mounted on the mounting sections of the respective types. Accordingly, the mounting section for tapping tool is used exclusively for the tapping tools and it is therefore not possible to mount any punching tools on the mounting section for tapping tool even in the case of a process using no tapping tools. Accordingly, there is a problem of a decrease in the types of tools to be loaded on the turret, which leads to a difficulty in handling various processes with a single turret punch press.

Meanwhile, to be specific, tapping on a plate-shaped workpiece may be performed by subjecting the workpiece to punching to form pilot holes having small diameters in the workpiece and then performing tapping either directly on the pilot holes or after subjecting the pilot holes to burring. Therefore, a punch press includes: a tap tool with a tap provided thereto rotatably and vertically movably for performing tapping. A tap die used in cooperation with the tap tool is given at a position below this tapping tool.

The above-mentioned technique has been disclosed in Patent Document 3, for example.

A tap die disclosed in Patent Document 3 has a configuration as shown in FIG. 1. Specifically, a tap die 505 to be used in cooperation with a tap tool 503, which is used by being mounted on a punch holder 501 such as an upper turret in a turret punch press, is detachably replaceably provided in a die holder 507 such as a lower turret in the punch press. The tap die 505 includes a cylindrical die body 509. An inner cylinder 515 is provided vertically movably inside this die body 509. The inner cylinder 515 has a tap contact member 513 located on an upper part thereof and pressed downward by a tap 511 being rotatably and vertically movably provided to the tap tool 103.

The inner cylinder 515 is always biased upward by means of coil springs 517, whereby an upper surface of this inner cylinder 515 is in contact with a lower surface of an inner flange 509F provided on an upper part of the die body 509. Further, a circumferential groove 521 capable of being communicatively connected to and disconnected from an air supply port 519 provided in the die body 509 is formed in an outer circumferential surface of the inner cylinder 515. This circumferential groove 521 communicates with the inside of the inner cylinder 515.

The air supply port 519 in the die body 509 is connected to an air source 523 via a connecting path 525. A pressure switch 527 for detecting whether the air supply port 519 and the circumferential groove 521 are in a communicatively connected state or disconnected state is connected to this connecting path 525.

Therefore, tapping is performed on a pilot hole WH in a workpiece W by: positioning the pilot hole WH formed in the workpiece W on the die body 509 in the tap die 505; bringing the tap tool 503 downward by use of a ram (a striker) vertically movably provided to the punch press; pressing and fixing the workpiece W onto the die body 509; bringing the tap 511 relatively downward; and rotating the tap 511.

Thereafter, as a lower end (a tip end) of the tap 511 comes into contact with the tap contact member 513 and lowers the inner cylinder 515 against a biasing force of the coil springs 517, the air supply port 519 is connected to the circumferential groove 521. Therefore, an air pressure inside the connecting path 525 is changed from a high pressure to a low pressure as the air supply port 519 previously in the communicatively disconnected state is connected to the circumferential groove 521, and it is hence possible to detect this change in air pressure by use of the pressure switch 527. Accordingly, when the tap 511 moves up after descending from a lifted position to the lowest descending position, it is possible to detect fracture and the like of the tap 511, for example, by detecting whether or not the pressure switch 527 repeats ON-OFF-ON operations.

However, in the above-described configuration, when a tap tool provided with a tap having a large diameter is erroneously mounted as the tap tool 503 to be mounted on the punch holder 501 in the punch press instead of the tap tool 503 provided with the tap 511 having the small diameter, a stroke length of the tap having the large diameter and a large screw pitch becomes greater even when the number of revolutions of the tap is the same. Accordingly, the tap is apt to lower the inner cylinder 515 after the inner cylinder 515 reaches a descending end, for example. This leads to a problem of causing fracture of the tap, damage on the tap tool, or the like.

Meanwhile, the above-described conventional configuration also has a problem that long chips being generated at the time of tapping may twine around the tap contact member, a problem that part of chips may enter a gap between the upper surface of the inner cylinder 515 and the inner flange 509F of the die body 509, and some other problems.

PRIOR ART DOCUMENTS

Patent Documents

Patent Document 1: Japanese Patent Application Laid-Open No. 2007-75889
Patent Document 2: Japanese Patent Application Laid-Open No. Hei 4-53626
Patent Document 3: Japanese Patent Application Laid-Open No. 2004-268247

DISCLOSURE OF THE INVENTION

Technical Problem

The present invention has been made to solve the above-mentioned problems. Therefore, a first object thereof is to provide an adapter for tapping which can easily handle various processes by use of a single turret punch press, and to provide a tapping tool used for this adapter for tapping.

A second object of the present invention is to provide a tap die which is capable of preventing chips from twining around a tap contact member of the tap die and of preventing chips from entering a gap between a die body and an inner cylinder of the tap die.

Further, a third object of the present invention is to provide a method of detecting tap overstroke to avoid fracture of a tap mounted on a tap tool and damage on the tap tool by detecting overstroke of the tap, and to provide a tap die used for the method.

Technical Solution

A first aspect of the present invention to achieve the above-described first object is an adapter for tapping used in a turret punch press, comprising: a ring gear in which a tapping tool is mountable; and a gear holder in which the ring gear is disposed and which is mountable on a turret of the turret punch press so as to locate the disposed ring gear at a position corresponding to a punch mounting section formed in advance in the turret of the turret punch press.

A second aspect of the present invention dependent on the first aspect is the adapter for tapping wherein, at least two ring gears are disposed, each of which is equivalent to the ring gear; tooth portions of the ring gears are separated from each other in an extending direction of central axes of rotation of the respective ring gears; part of the tooth portion of one ring gear out of the ring gears overlap part of the tooth portion of another one ring gear out of the ring gears when viewed in the extending direction of the central axes of rotation of the ring gears; and the gear holder is provided with an intermediate gear meshed with the ring gears.

A third aspect of the present invention is a tapping tool mountable on an adapter for tapping including: ring gear in which the tapping tool is mountable; and a gear holder in which the ring gear is disposed and which is mountable on a turret of the turret punch press so as to locate the disposed ring gear at a position corresponding to a punch mounting section formed in advance in the turret, the tapping tool comprising: a cylindrical body including a master screw formed on an inner circumference thereof and being disposed in a through-hole of the ring gear and a mounting section of the turret; and a rotating body being configured to be capable of holding a tap, including a master screw formed on an outer circumference thereof so as to be threadedly engaged with the master screw on the cylindrical body, being disposed inside the cylindrical body by threadedly engaging the master screw with the master screw on the cylindrical body, rotating along with rotation of the ring gear, and moving in an extending direction of a central axis of the rotation.

A fourth aspect of the present invention dependent on the third aspect is the tapping tool further comprising: rotation regulating means (rotation regulator) for regulating rotation of the rotating body relative to the cylindrical body when the tapping tool is detached from the turret.

A fifth aspect of the present invention dependent on any one of the third and fourth aspects is the tapping tool wherein the rotating body is configured to be electrically insulated from the adapter for tapping and the turret when the tapping tool is disposed in the through-hole of the ring gear and the mounting section of the turret.

A sixth aspect of the present invention to achieve the above-described second object is a tap die used in cooperation with a tap tool to be mounted on and used in a punch press, comprising: a cylindrical die body; and an inner cylinder being provided inside the die body and including a tap contact member pressed downward by a tap provided vertically movably to the tap tool, the inner cylinder being provided vertically movably and biased upward, wherein an upper end of the inner cylinder is provided substantially at a same height as an upper end of the die body; the tap contact member is formed of a plate material; and the tap contact member is so formed that a width dimension of the tap contact member in a vertical direction is greater than a plate thickness dimension thereof.

A seventh aspect of the present invention dependent on the sixth aspect is the tap die wherein an upper surface of the tap contact member is provided at a position lower than the upper end of the inner cylinder; and a lower end of the tap contact member is provided at a position higher than an air ejection port provided to the inner cylinder.

An eighth aspect of the present invention dependent on any one of the sixth and seventh aspects is the tap die wherein the upper surface of the tap contact member is formed into a curved surface whose both ends in a thickness direction of the tap contact member are made lower.

A ninth aspect of the present invention to achieve the above-described third object is a method of detecting overstroke of a tap mounted on a tap tool to be mounted on and used in a punch press, the method comprising the steps of providing an inner cylinder including a tap contact member pressed downward by a tap provided vertically movably to the tap tool, the inner cylinder being provided vertically movably and biased upward inside a cylindrical die body of a tap die to be used in cooperation with the tap tool; providing a plurality of upper and lower communicating portions in an outer circumferential surface of the inner cylinder, the communicating portions each being communicatively connectable to and disconnectable from an air supply port provided to the die body; providing a fluid sensor to detect states of communicative connection and disconnection between the air supply port and the communication portions, in a connecting path connecting an air source to the air supply port; and detecting overstroke of the tap when the fluid sensor performs ON, OFF, and ON operations at the time of a descending action of the tap provided to the tap tool.

A tenth aspect of the present invention is a tap die used in cooperation with a tap tool to be mounted on and used in a punch press, comprising: a cylindrical die body; and an inner cylinder being provided inside the cylindrical die body and including a tap contact member pressed downward by a tap provided vertically movably to the tap tool, the inner cylinder being provided vertically movably and biased upward inside the cylindrical die body; an air supply port provided to the die body; and a plurality of upper and lower communicating portions provided in an outer circumferential surface of the inner cylinder, and being communicatively connectable to and disconnectable from the air supply port.

An eleventh aspect of the present invention dependent on the tenth aspect is the tap die wherein the plurality of upper and lower communicating portions are provided respectively to portions located at one side of a concave portion formed in the outer circumferential surface of the inner cylinder.

Advantageous Effects

According to the present invention described in the aforementioned first to the fifth aspects, it is possible to achieve an effect of allowing easy handling of various processes by use of a single turret punch press.

In addition, according to the present invention described in the aforementioned sixth to eighth aspects, it is possible to prevent chips from twining around the tap contact member and to prevent chips from entering a gap between the die body and the inner cylinder. Therefore, it is possible to solve the above-described problem of the related art.

Further, according to the present invention described in the ninth to eleventh aspects, the fluid sensor carries out ON-OFF-ON operations when the tap provided to the tap tool descends and hence, it is possible to detect overstroke of the tap mounted on the tap tool. Therefore, it is possible to solve the above-described problem of the related art.

BEST MODES FOR CARRYING OUT THE INVENTION

A mode for carrying out the present invention will be described below by using drawings.

Figure 1:
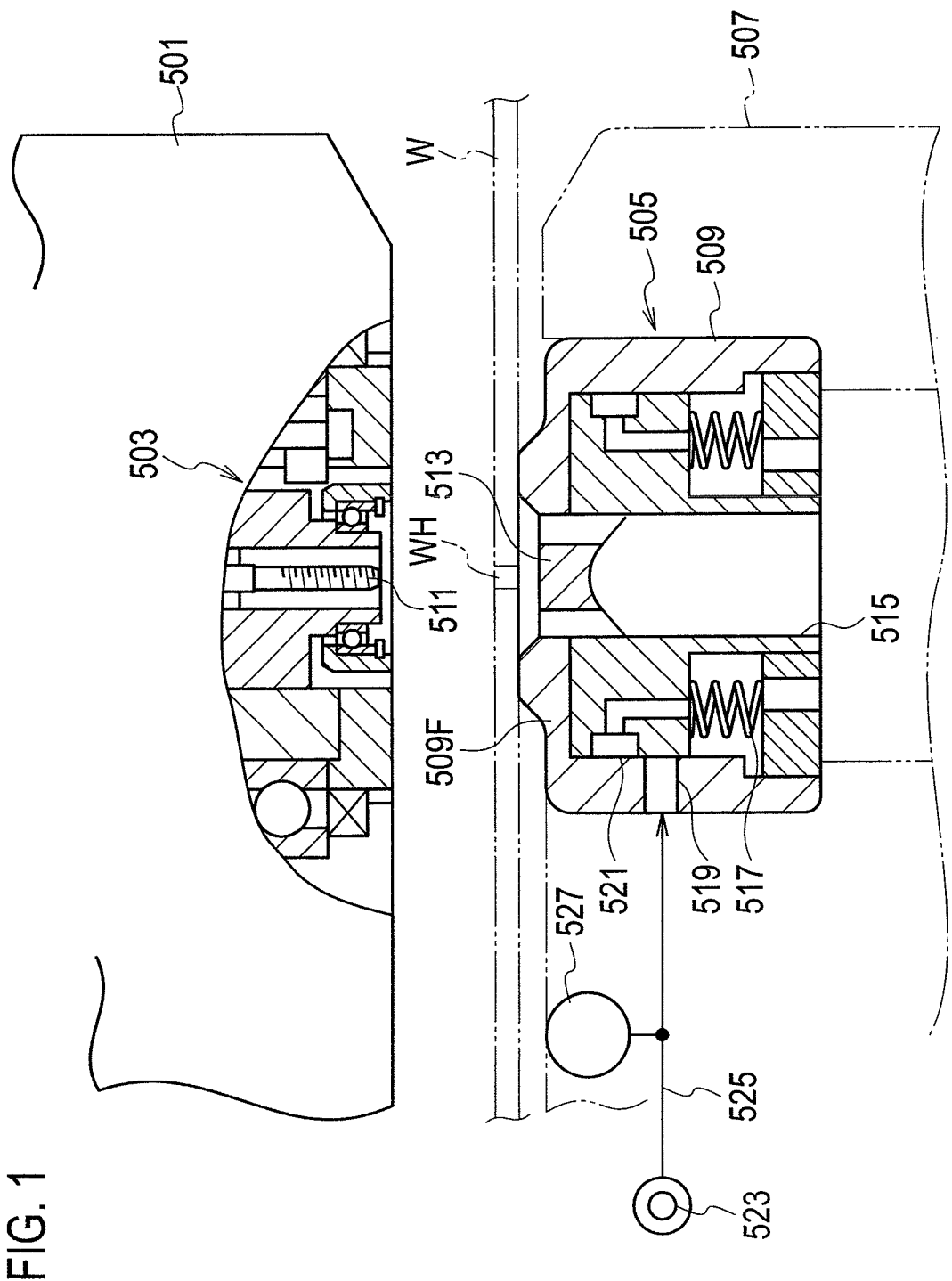
FIG. 1 is a cross-sectional explanatory view showing a conventional tap tool and a conventional tap die.
Figure 2:
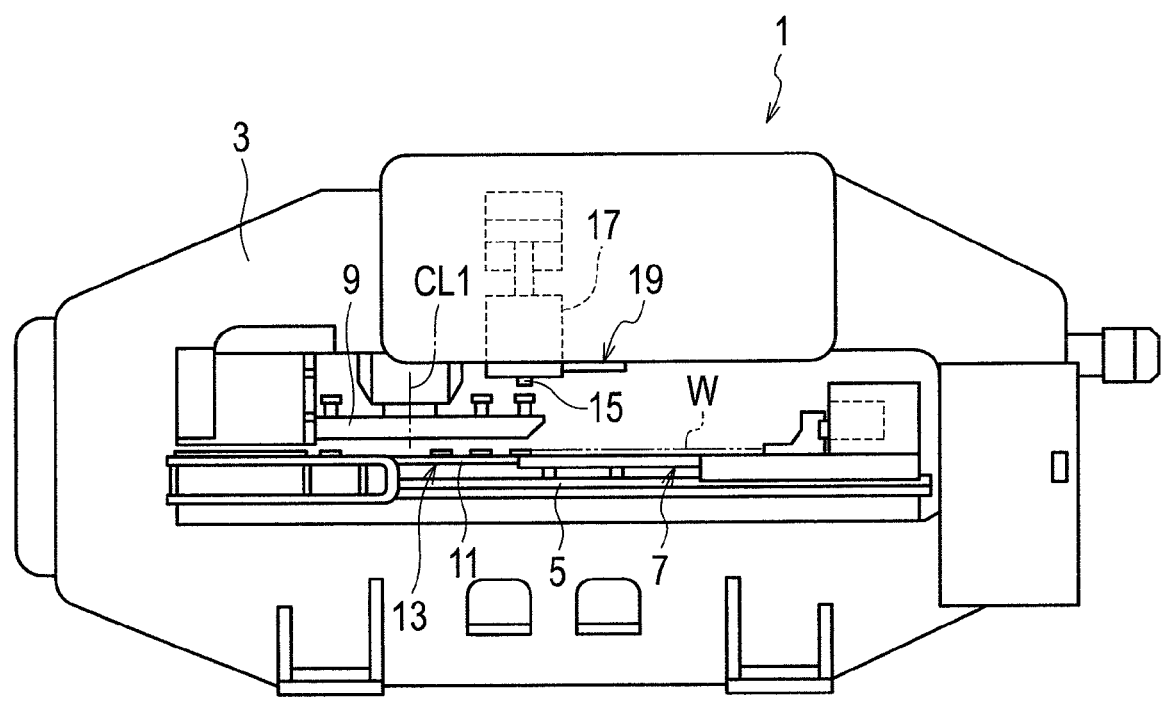
FIG. 2 is a view showing a schematic configuration of a turret punch press 1.
Figure 3:
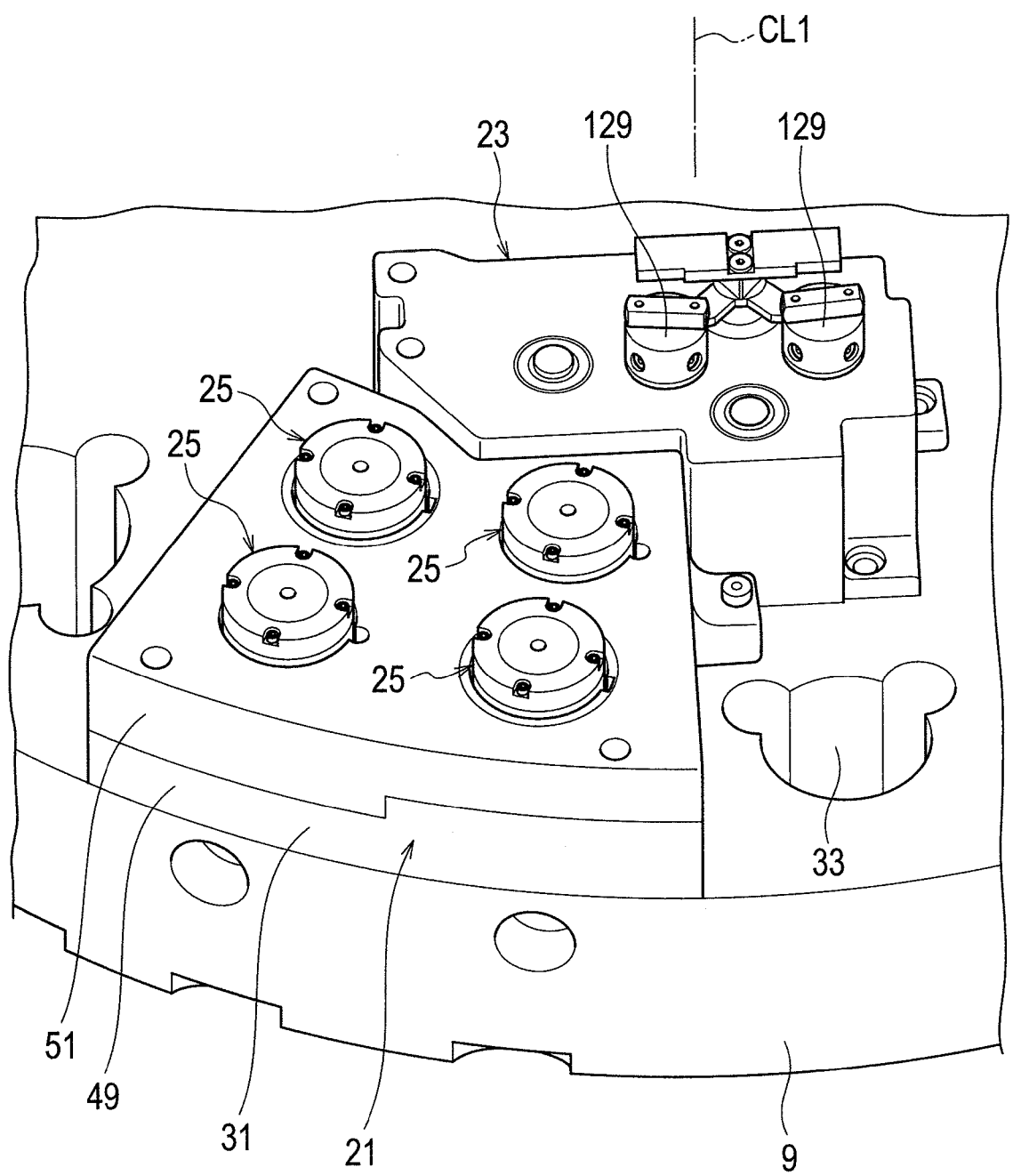
FIG. 3 is a perspective view showing a state of disposing, on an upper turret 9, an adapter 21 for tapping, and an adapter 23 for tapping-unit rotational drive constituting tapping-unit rotationally driving means.
Figure 4:
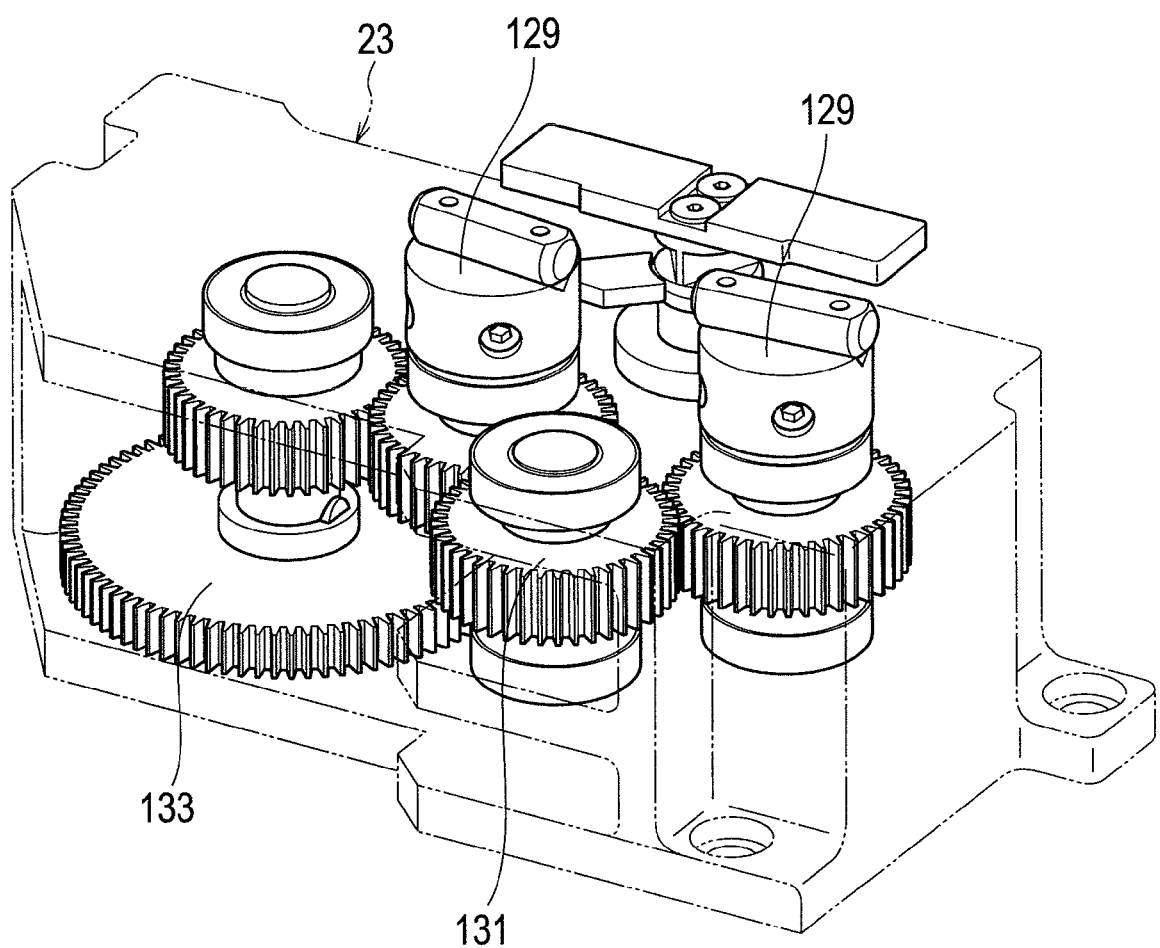
FIG. 4 is a perspective view showing a schematic configuration of the adapter 23 for tapping unit rotary drive in a see-through manner.
Figure 5:
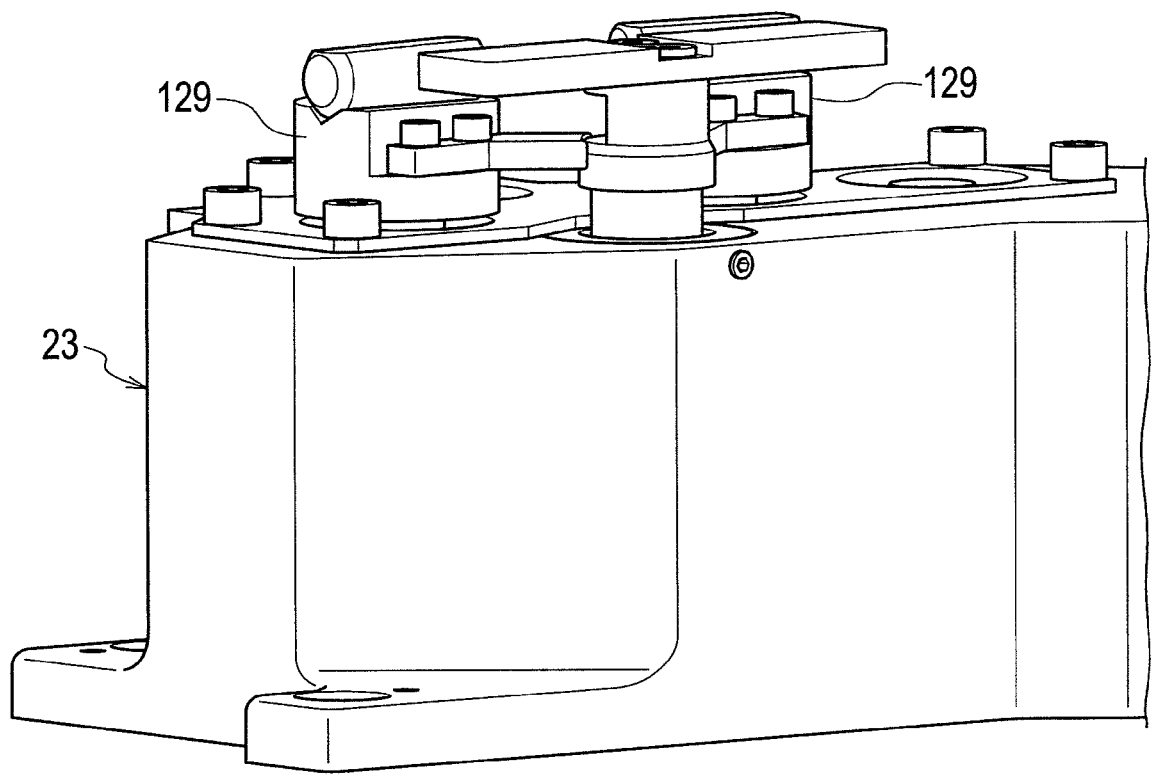
FIG. 5 is a perspective view showing the schematic configuration of the adapter 23 for tapping unit rotary drive (a perspective view which is viewed from a different angle from FIG. 4).

FIG. 2 is a view showing a schematic configuration of a turret punch press 1, on which an adapter for tapping, a tapping tool, a tap die, and the like based on the present invention are mounted and which embodies a method of detecting overstroke of a tap, the tap die being capable of improving a discharge performance of chips generated at the time of tapping.

The turret punch press 1 includes a frame 3. Moreover, the turret punch press 1 includes: a table 5 supporting a plate-shaped workpiece W; a workpiece positioning device 7 used for positioning of the workpiece W; and a turret device 13 including a disc-shaped upper turret 9 on which multiple punches (not shown) or tapping units (tapping tools) can be disposed (an upper turret capable of being positioned pivotally around a central axis of rotation CL1), and a disc-shaped lower turret 11 on which multiple dies (not shown) or holed dies can be freely disposed in lower positions corresponding to the punches or the tapping units.

Moreover, a striker 15 striking (applying a force in a downward direction to) the tapping units or the punches in the upper turret 9, and a ram body 17 are provided vertically movably to the frame 3. In order to selectively strike the punches or the tapping units arranged in a radial direction of the upper turret 9, a striker moving mechanism 19 is provided between the striker 15 and the ram body 17.

Further, tapping-unit rotationally driving means (not shown in FIG. 2) for rotationally driving the tapping units is provided on an upper part of the frame 3.

Subsequently, an adapter 21 for tapping, and the like will be described.

The adapter 21 for tapping is disposed and used on an upper surface of the upper turret 9 of the turret punch press 1 and includes ring gears 29 and a gear holder 31.

The ring gears 29 are so configured that tapping tools 25 can be mounted on (detachably attached to) the inside thereof. The gear holder 31 is so configured that the upper turret 9 can be mounted thereon (detachably attached thereto). In a state where the gear holder 31 is mounted on the upper turret 9, the ring gears 29 disposed in the gear holder 31 are located in positions corresponding to punch mounting sections 33 formed in advance in the upper turret 9 of the turret punch press 1.

Figure 6:
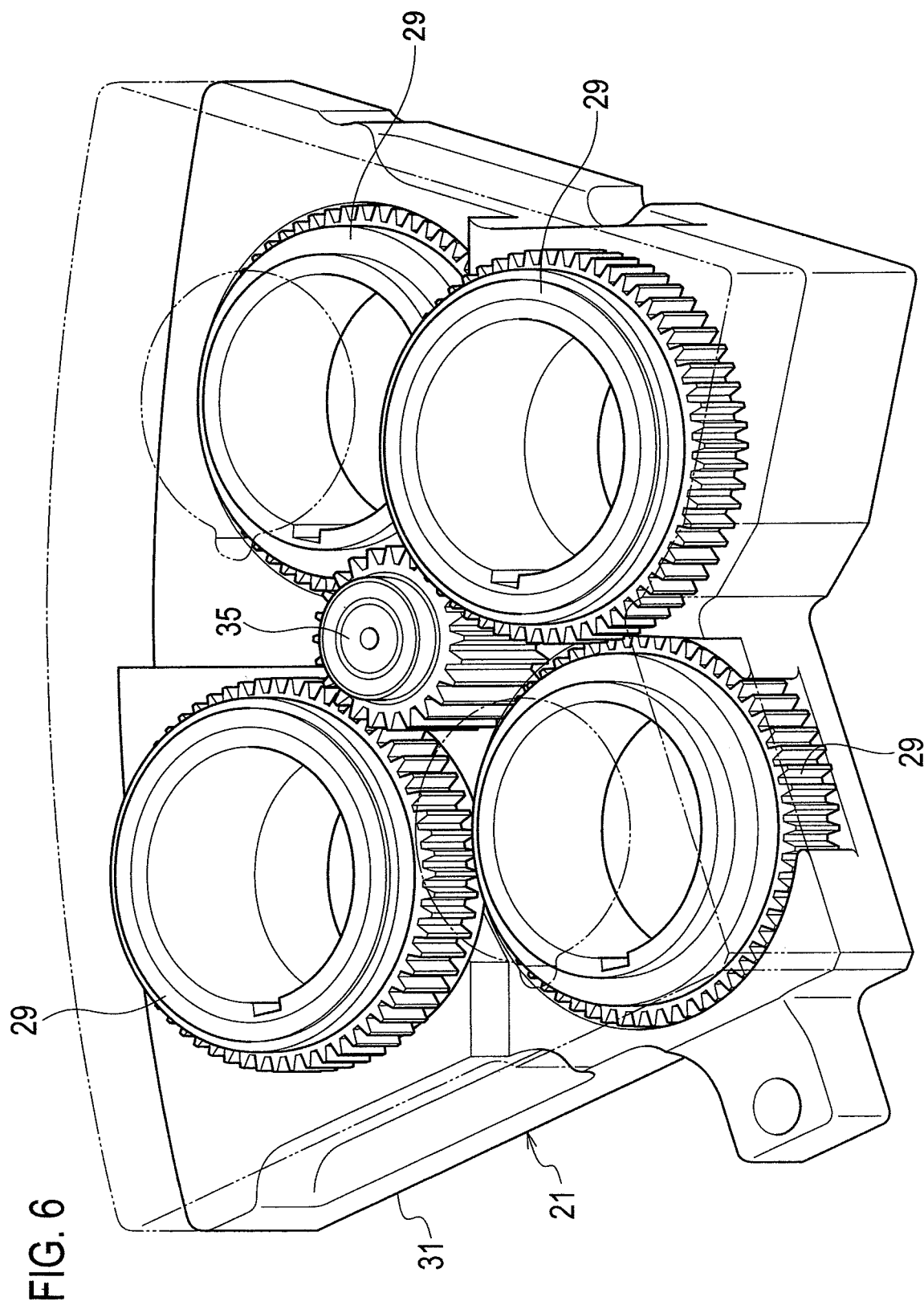
FIG. 6 is a perspective view showing a schematic configuration of the adapter 21 for tapping in a see-through manner.

At least two ring gears 29 (a plurality: four pieces in FIG. 6 and FIG. 10) are disposed in one gear holder 31. Tooth portions of the ring gears 29 are located away from one another in an extending direction of central axes of rotation CL2 of the respective ring gears 29 (see FIG. 11). On the other hand, when viewed in the extending direction of the central axes of rotation CL2 of the ring gears 29, a portion on a tip end side of the tooth portions of one ring gear 29 (e.g., a ring gear 29A) out of two ring gears 29 overlaps with a portion on a tip end side of the tooth portion of the other ring gear 29 (e.g., a ring gear 29D) out of the two ring gears 29 (see FIG. 10). The gear holder 31 is provided with an intermediate gear 35 which is engaged with the ring gears 29.

Figure 8:
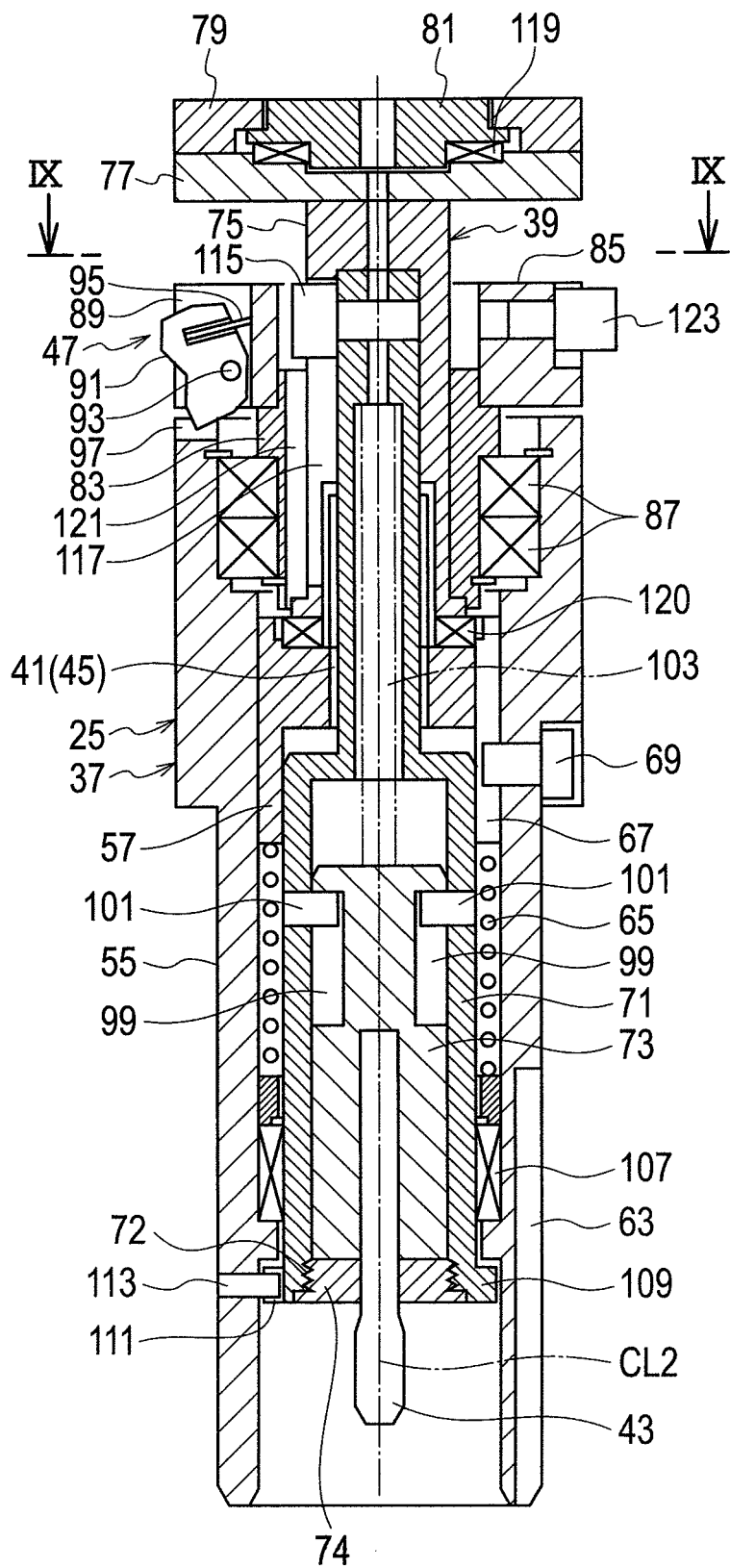
FIG. 8 is a cross-sectional view showing a schematic configuration of the tapping tool 25.
Figure 9:
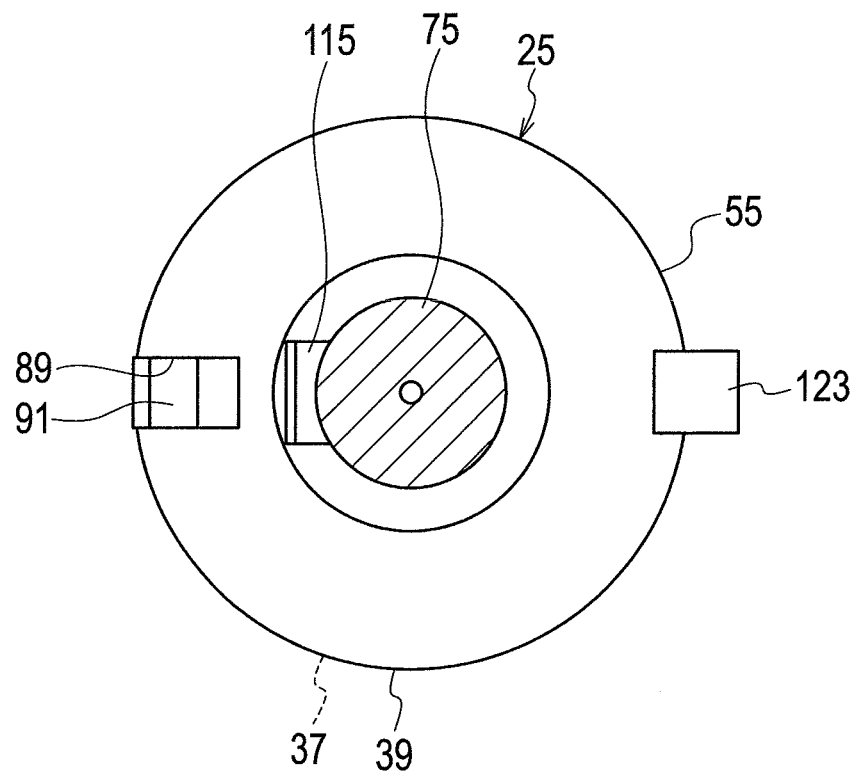
FIG. 9 is a view showing an IX-IX cross section in FIG. 8.

Each tapping tool 25 is configured mountable on the adapter 21 for tapping as described above and is provided with a cylindrical body 37 and a rotating body 39 (see FIG. 8).

A master screw (a female screw) 41 is formed on an inner circumference of the cylindrical body 37. The cylindrical body 37 is inserted to and disposed in a through-hole of the ring gear 29 and the mounting section 33 of the upper turret 9 in such a state that rotation of the cylindrical body 37 may be regulated, when the adapter 21 for tapping is disposed on the upper turret 9.

The rotating body 39 includes a tap holding mechanism, and is so configured that a tap 43 can be mounted thereon (detachably attached thereto). A master screw (a male screw) 45 threadedly engaged with the master screw 41 on the cylindrical body 37 is formed on an outer circumference of the rotating body 39. The rotating body 39 is located inside the cylindrical body 37 as this master screw 45 is threadedly engaged with the master screw 41. Meanwhile, when the rotating body 39 is rotated by rotation of the ring gear 29 in a state where the adapter 21 for tapping is disposed on the upper turret 9 and the tapping tool 25 (the cylindrical body 37) is disposed in the through-hole of the ring gear 29 and the mounting section 33 of the upper turret 9, the rotating body 39 (the tap 43) moves in the extending direction of the central axis of rotation CL2 thereof (to move by way of the threaded engagement between the master screws 41 and 45).

The tapping tool 25 is provided with rotation regulating means (rotation regulator) 47. The rotation regulating means 47 regulates rotation of the rotating body 39 relative to the cylindrical body 37 when the tapping tool 25 is detached from the upper turret 9 and the adapter 21 for tapping (the adapter for tapping disposed on the upper turret 9). Here, the rotation regulating means 47 is configured to be inactivated so as to allow the rotating body 39 to rotate relative to the cylindrical body 37, when the tapping tool 25 is disposed in the through-hole of the ring gear 29 and the mounting section 33 of the upper turret 9 in a state where the adapter 21 for tapping is disposed on the upper turret 9.

Meanwhile, in the tapping tool 25, when the adapter 21 for tapping is disposed on the upper turret 9 and the tapping tool 25 is disposed in the through-hole of the ring gear 29 and the mounting section 33 of the upper turret 9, the rotating body 39 and the tap 43 disposed in this rotating body 39 are configured to be electrically insulated from the adapter 21 for tapping and the upper turret 9.

The tapping tool 25 and so forth will be described further in detail.

Each ring gear 29 is formed into a cylindrical shape and provided with a columnar through-hole at a central part thereof to mount the tapping tool 25, and teeth of a spur gear, for example, are formed on an outer circumference thereof.

The upper turret 9 is formed into a disc shape. Each punch mounting section 33 of the upper turret 9 includes a through-hole of a columnar shape, for example, which penetrates the upper turret 9 in a thickness direction thereof.

When the gear holder 31 with the ring gears 29 disposed therein is mounted on the upper turret 9, the central axes of rotation CL2 of the ring gears 29 extend in the thickness direction of the upper turret 9 and the through-holes of the mounting sections 33 of the upper turret 9 and the through-holes of the ring gears 29 substantially overlap one another when viewed in the thickness direction of the upper turret 9. Moreover, the central axes of the through-holes of the upper turret 9 and the central axes of rotation CL2 of the through-holes of the ring gears 29 coincide with one another. Further, through-holes 21A provided in the gear holder 31 supporting the ring gears 29 substantially overlap the through-holes of the mounting sections 33 of the upper turret 9 and the through-holes of the ring gears 29 when viewed in the thickness direction of the upper turret 9 (see FIG. 11).

The ring gears 29 are located in mutually different attaching positions on the gear holder 31 but are formed substantially into the same shape. A facewidth of each of the ring gears 29 is set smaller than a half value of a height of the gear holder 31 which is in a range from about $\frac{1}{3}$ to $\frac{1}{5}$, for example. The number of teeth on the intermediate gear 35 is fewer than the number of teeth on each ring gear 29, for example. A facewidth of the intermediate gear 35 is greater than twice of the facewidth of each ring gear 29 but smaller than the height of the gear holder 31.

Moreover, when the ring gears 29 and the intermediate gear 35 are disposed in the gear holder 31, an upper end of the tooth portion of one of the ring gears 29 existing on the uppermost side in the vertical direction (the extending direction of the central axes of rotation CL2 of the gears 29 and 35) is located at the same position as an upper end of the tooth portion of the intermediate gear 35, while a lower end of the tooth portion of another one of the ring gears 29 existing on the lowermost side is located at the same position as a lower end of the tooth portion of the intermediate gear 35. In addition, the upper end of the tooth portion of the intermediate gear 35 is located at a position lower than an upper end of the gear holder 31 while the lower end of the tooth portion of the intermediate gear 35 is located at a position higher than a lower end of the gear holder 31.

To put it in more detail, the disc-shaped upper turret 9 is disposed such that the thickness direction thereof may be defined as the vertical direction, and is capable of freely deciding an index position pivotally around the central axis of rotation CL1 that extends in the vertical direction as described previously.

The multiple columnar through-holes constituting the mounting sections 33 of the upper turret 9 are formed in the upper turret 9 while extending in the vertical direction. Moreover, these through-holes are arranged in a line or in multiple lines along a radial direction of the upper turret 9 and are provided at predetermined intervals along a circumferential direction of the upper turret 9. When the adapter 21 for tapping is not disposed, punches for performing punching, and the like can be disposed freely in the mounting sections 33.

Here, as is already understood, the upper turret 9 in this embodiment is assumed to be disposed so as to align the thickness direction thereof with the vertical direction, for example. Therefore, the central axes of rotation CL2 of the through-holes constituting the mounting sections 33 of the upper turret 9 and the central axes of rotation CL2 of the ring gears 29 are supposed to extend in the vertical direction.

Meanwhile, the adapter 21 for tapping is provided with four ring gears 29 (29A, 29B, 29C, and 29D), for example, and is used after integrally disposed on the upper side of the upper turret 9 at positions where four through-holes (the though holes constituting the mounting sections 33: the through-holes which are adjacent to one another in the radial direction of the upper turret 9 and adjacent to one another in the circumferential direction of the upper turret 9) are provided in the upper turret 9, in such a manner as to cover the through-holes. Here, the number of the ring gears 29 and the like may be a plural number other than four.

The gear holder 31 includes a lower frame 49 and an upper frame 51. The ring gears 29 are supported rotatably (so as to be rotatable around the axes CL2) on the gear holder 31 through bearings 53. Here, in the state where the gear holder 31 (the adapter 21 for tapping) with the ring gears 29 disposed therein is integrally disposed on the upper turret 9 by use of fasteners such as bolts, the central axes of the four through-holes of the upper turret 9 and the central axes CL2 of the four ring gears 29 coincide with one another.

As described previously, each tapping tool 25 includes the cylindrical body 37 and the rotating body 39. The cylindrical body 37 includes a cylindrical outer holder 55 and a cylindrical gauge nut 57.

Figure 11:
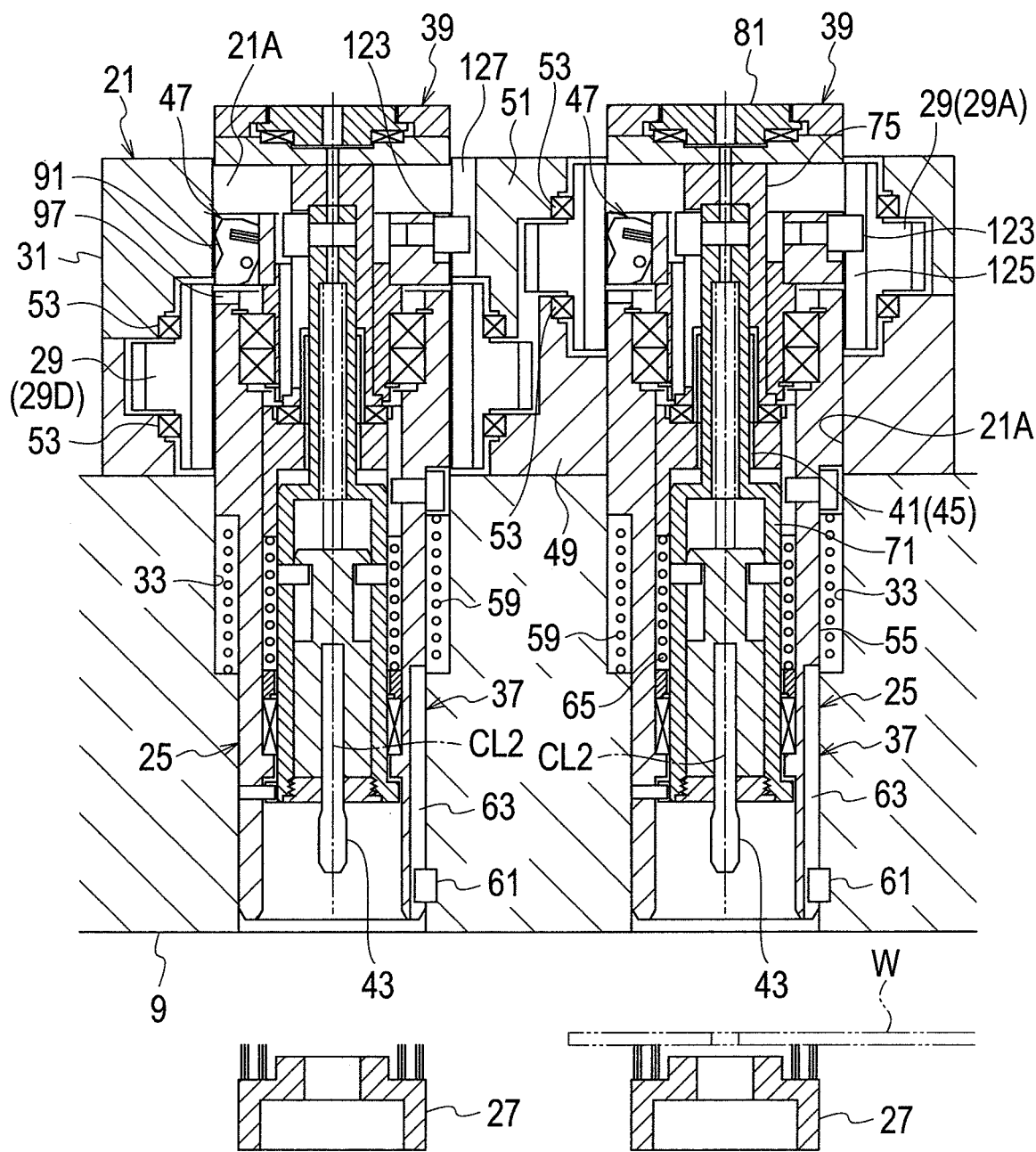
FIG. 11 is a view showing an XI-XI cross section in FIG. 10.

In the state where the tapping tool 25 is disposed in the mounting section 33 of the upper turret 9 and the adapter 21 for tapping, the outer holder 55 is biased upward relative to the upper turret 9 by a lifter spring 59 (see FIG. 11). Meanwhile, in the above state, the outer holder 55 is prevented from rotating around the axis CL2, as a key 61 provided at a lower part of the through-hole of the upper turret 9 is engaged with a key groove 63 provided at a lower part of the outer circumference of the outer holder 55. That is, the outer holder 55 is movable only in the vertical direction relative to the upper turret 9.

The gauge nut 57, on which the master screw 41 is formed, is provided at an inner side of an intermediate part, in the height direction, of the outer holder 55. The gauge nut 57 is biased upward relative to the outer holder 55 by a lifter spring 65. Meanwhile, a key groove 67 is formed in an outer circumference of the gauge nut 57. The gauge nut 57 is prevented from rotating around the axis CL2 as this key groove 67 is engaged with a key 69 provided to the outer holder 55. That is, the gauge nut 57 is movable only in the vertical direction relative to the outer holder 55.

The rotating body 39 includes: a shaft (a ram) 71 which has a lower side formed into a cylindrical shape and an upper side formed into a columnar shape; the tap holding mechanism to which the tap 43 is detachably attached (the tap holding mechanism includes a columnar tap is holder body 73); a shaft supporter body 75 having a lower side formed into a cylindrical shape and an upper side formed into a columnar shape; a lower-side pressing-body supporter body 77 formed into a disc shape; an upper-side pressing-body supporter body 79 formed into a ring shape; a pressing body 81 formed into a disc shape; an inner holder 83 formed into a cylindrical shape; and a driving block 85 formed into a ring shape. Here, a covering member 74 is formed below the shaft 71 by use of a screw 72 so that the tap 43 can be easily attached and detached to and from each tap holder body 73.

The inner holder 83 and the driving block 85 are integrally fixed to each other. The inner holder 83 and the driving block 85 are rotatably supported on the outer holder 55 (so as to be rotatable around the axis CL2) through bearings 87 so as to allow the inner holder 83 to enter the inside of an upper part of the outer holder 55 and to allow the driving block 85 to protrude above the outer holder 55.

A groove 89 is formed in an outer circumference of the driving block 85 and a release lever 91 is provided in this groove 89 so as to be turnable around a shaft 93. In the state where the tapping tool 25 is not disposed on the upper turret 9 or the adapter 21 for tapping, the release lever 91 is biased by an elastic body such as a compression coil spring 95, whereby a part of the release lever 91 enters a groove 97 formed in an upper end of the outer holder 55 so as to prevent the inner holder 83 and the driving block 85 from rotating relative to the outer holder 55. On the other hand, when the tapping tool 25 is disposed on the upper turret 9 and the adapter 21 for tapping, another part of the release lever 91 is pressed and turned by inner walls of the gear holder 31 and the ring gear 29, whereby the aforementioned part of the release lever 91 comes out of the groove 97 formed in the upper end of the outer holder 55 so as to allow the inner holder 83 and the driving block 85 to rotate relative to the outer holder 55.

The tap holding mechanism (the tap holder body 73) is provided on a lower side of the inside of the shaft 71. The tap holder body 73 is prevented from rotating relative to the shaft 71 as key grooves 99 formed in an outer circumference of this tap holder body 73 are engaged with keys 101 provided to the shaft 71, so that the tap holder body 73 can move only for a predetermined distance in the vertical direction. Meanwhile, the tap holder body 73 is biased downward by an elastic body such as a compression coil spring 103. Note that the tap holder body 73 (the tap 43) is located at the lowest position relative to the shaft 71 in the state shown in FIG. 8.

Figure 7:
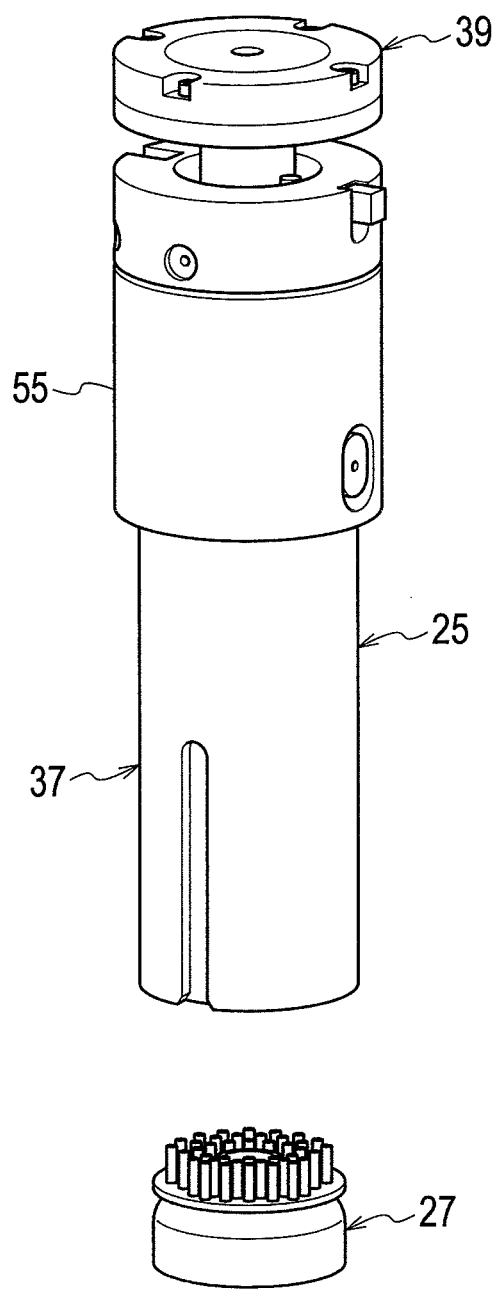
FIG. 7 is a perspective view of a die 27 and of a tapping tool 25 to be disposed on the adapter 21 for tapping.

The shaft 71 is supported, on this lower side, on the outer holder 55 through a bearing 107, and is rotatable relative to the outer holder 55 (rotatable around the axis CL2) and vertically movable relative to the outer holder 55. Note that the shaft 71 is located at the highest position relative to the outer holder 55 in the state shown in FIG. 7.

Meanwhile, a ring-like flange 109 is formed at a lower end of the shaft 71. A dimension (thickness) in the vertical direction of this flange 109 is small. A groove (a notch) 111 is formed in the flange 109. As this groove 111 is engaged with a key (a pin) 113 provided to the outer holder 55, the shaft 71 is prevented from rotating relative to the outer holder 55 in the state shown in FIG. 8. Here, when the shaft 71 descends slightly from the state shown in FIG. 8 relative to the outer holder 55, the groove 111 on the flange 109 is disengaged from the key 113 on the outer holder 55 so that the shaft 71 can rotate relative to the outer holder 55.

The master screw 45 is formed on the outer circumference of an intermediate portion, in the vertical direction, of the shaft 71 and this master screw 45 is threadedly engaged with the master screw 41 on the gauge nut 57. Therefore, when the shaft 71 rotates relative to the gauge nut 57, the shaft 71 (the tap 43) moves in the vertical direction relative to the gauge nut 57 while rotating.

A region on an upper side of the shaft 71 is inside the shaft supporter body 75. Meanwhile, a key 115 is provided at an upper part of the shaft 71. As this key 115 is engaged with a key groove 117 provided in the shaft supporter body 75, the shaft 71 is prevented from rotating relative to the shaft supporter body 75 but is rendered movable in the vertical direction relative to the shaft supporter body 75.

A lower end of the shaft supporter body 75 is supported so as to be rotatable relative to the gauge nut 57 through a bearing such as a thrust bearing 120. Here, when a downward force is applied to the pressing body 81 in the state shown in FIG. 8, the force thus applied is transmitted to the gauge nut 57 via a bearing 119, the lower-side pressing-body supporter body 77, the shaft supporter body 75, and the bearing 120, thereby contracting the lifer spring 65 and allowing the gauge nut 57 (the shaft 71) to move downward.

The lower side of the shaft supporter body 75 is inside the inner holder 83 and the shaft supporter body 75 can move vertically relative to the inner holder 83. Meanwhile, the key 115 provided at the upper part of the shaft 71 is also engageable with a key groove 121 that is provided in an inner circumference of the inner holder 83.

Specifically, in the state shown in FIG. 8, the key 115 provided at the upper part of the shaft 71 is located above the key groove 121 in the inner holder 83 and therefore separated from this key groove 121. However, when a downward force is applied to the pressing body 81 in the state shown in FIG. 8, the shaft supporter body 75 and the shaft 71 descend relative to the inner holder 83. Accordingly, the key 115 provided at the upper part of the shaft 71 is engaged with the key groove 121 in the inner holder 83, and the key groove 111 at the lower part of the shaft 71 is separated from the key 113 on the outer holder 55. Hence, the shaft 71 (the shaft supper body 75 and the tap 43) is allowed to rotate by way of rotation of the inner holder 83 (the driving block 85). Moreover, since the master screws 41 and 45 are threadedly engaged with each other, the shaft 71 (the tap 43) is allowed to descend by way of rotation of the shaft 71.

The lower-side pressing-body supporter body 77 is integrally provided on an upper end of the shaft supporter body 75. The pressing body 81 is rotatably provided above the lower-side pressing-body supporter body 77 via the bearing such as the thrust bearing 119 mentioned previously. Meanwhile, the ring-like upper-side pressing-body supporter body 79 is integrally provided in the vicinity of an upper part of the lower-side pressing-body supporter body 77. The pressing body 81 is pressed by this upper-side pressing-body supporter body 79 and is thereby prevented from being separated upward from the lower-side pressing-body supporter body 77.

Here, outside diameters of the pressing-body supporter bodies 77 and 79 are set slightly smaller than an inside diameter of the ring gear 29 and an inside diameter of the through-hole 21A of the gear holder 31. Moreover, by pressing the tapping tool 25 downward by use of the striker 15 in the state of being disposed on the mounting section 33 of the upper turret 9 and the adapter 21 for tapping, the pressing-body supporter bodies 77 and 79 as well as the pressing body 81 are allowed to enter the inside of the ring gear 29 and of the through-hole 21A on the gear holder 31.

Meanwhile, outside diameters of the driving block 85 and the outer holder 55 are set slightly smaller than an inside diameter of the through-hole of the mounting section 33 of the upper turret 9, the inside diameter of the ring gear 29, and the inside diameter of the through-hole 21A of the gear holder 31 so that the tapping tool 25 can be inserted to and disposed in the mounting section 33 of the upper turret 9 and the adapter 21 for tapping.

A key (a pin) 123 is provided to and protrudes from the outer circumference of the driving block 85. When this key 123 enters a key groove 125 formed in an inner circumference of the ring gear 29 and gets engaged therewith (see FIG. 11), the driving block 85 is allowed to rotate along with rotation of the ring gear 29.

Note that a groove 127 for the key 123 on the driving block 85 to enter is also formed inside the through-hole 21A of the gear holder 31. The key 123 on the driving block 85 of the tapping tool 25 located on the left side in FIG. 11 is engaged with the groove 127 provided in the through-hole 21A of the gear holder 31. Accordingly, the driving block 85 does not rotate along with rotation of the ring gear 29 on the left side in FIG. 11. However, by pressing the pressing body 81 downward, the driving block 85 on the left side in FIG. 11 moves downward and is engaged with the key groove 125 in the ring gear 29 so as to allow the driving block 85 to rotate along with rotation of the ring gear 29.

In the tapping tool 25 shown on the right side in FIG. 11, the key 123 on the driving block 85 is engaged with the key groove 125 formed inside the ring gear 29. Accordingly, the driving block 85 is allowed to rotate along with rotation of the ring gear 29 even in the state shown in FIG. 11. Further, in the tapping tool 25 shown on the right side in FIG. 11, the key 123 on the driving block 85 remains engaged with the key groove 125 in the ring gear 29 even when the pressing body 81 is pressed downward and the driving gear 85 moves downward.

Moreover, when the pressing body 81 is pressed downward in the state shown in FIG. 11, the shaft supporter body 75 and the shaft 71 also move downward, whereby the key groove 111 at the lower part of the shaft 71 is disengaged from the key 113 on the outer holder 55 and the key 115 provided at the upper part of the shaft 71 is engaged with the key groove 121 in the inner holder 83. Hence a rotative force of the ring gear 29 (the driving block 85 and the inner holder 83) is transmitted to the shaft 71 (the tap 43) so that the shaft 71 can move downward while rotating.

Now, the adapter 21 for tapping will be described further.

Figure 10:
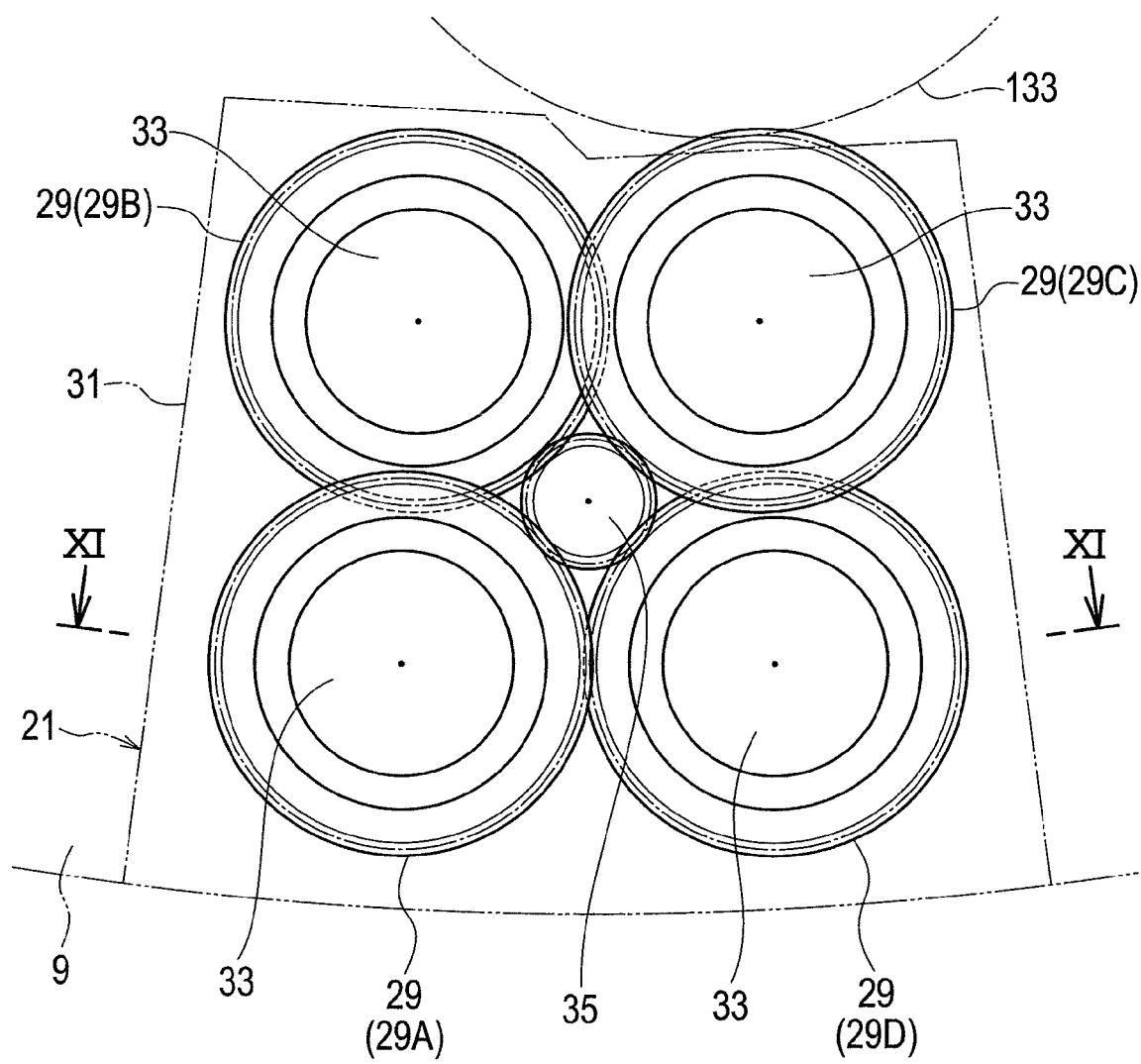
FIG. 10 is a plan view showing schematic configurations of the adapter 21 for tapping and so forth.

Among the four ring gears 29, the tooth portions of a pair of ring gears 29 on a diagonal line (the ring gear 29A on the lower left side shown in FIG. 10 and the ring gear 29C on the upper right side shown in FIG. 10) are located higher like the ring gear 29A shown on the right side in FIG. 11. Meanwhile, among the four ring gears 29, the tooth portions of a pair of ring gears 29 on the other diagonal line (the ring gear 29B on the upper left side shown in FIG. 10 and the ring gear 29D on the lower right side shown in FIG. 10) are located lower like the ring gear 29D shown on the left side in FIG. 11. Meanwhile, in the plan view, the intermediate gear 35 is located inward of the four ring gears 29 as shown in FIG. 10.

Moreover, an adapter 23 for tapping-unit rotational drive is provided above the upper turret 9 and in the vicinity of the inside of the adapter 21 for tapping (the inside of the upper turret 9 in the circumferential direction). The adapter 23 for tapping-unit rotational drive is provided with multiple (two, for example) rotation input shafts 129 (129A and 129B) and these two rotation input shafts 129 are interlocked and connected with an output gear 133 via a gear train 131. Moreover, the output gear 133 is rotated by inputting a rotative force from an actuator (not shown) provided in the turret punch press 1 to one input shaft out of the two input shafts 129. As shown in FIG. 10, the output gear 133 is meshed with the ring gear 29C out of the four ring gears 29.

In this way, when a rotative force is inputted to the rotation input shaft 129, the ring gears 29 rotate in the same direction at the same turning angle velocity.

Meanwhile, the outer holder 55, the driving block 85, the release lever 91, the key 123, and the pressing-body supporter bodies 77 and 79 are made of insulators that block electricity, or alternatively, surfaces of the outer holder 55, the driving block 85, the release lever 91, the key 123, and the pressing-body supporter bodies 77 and 79 are covered with insulative coatings. Hence, the rotating body 39 (the tap 43) is electrically insulated from the adapter 21 for tapping and the mounting sections 33 of the upper turret 9 when the tapping tools 25 are disposed in the through-holes of the gear holder 31, the through-holes of the ring gears 29, and the mounting sections 33 of the upper turret 9.

Next, operations of the turret punch press 1 will be described by referring to FIG. 11 to FIG. 14(*b*).

First, as shown in FIG. 11, as an initial state, the upper turret 9, the striker 15, and the workpiece W subjected to a pilot hole process are located at predetermined positions. Here, it is assumed that the rotating bodies 39 of the tapping tools 25 are located at the ascending ends and no rotative force is inputted to the adapter 23 for tapping-unit rotational drive.

Figure 12:
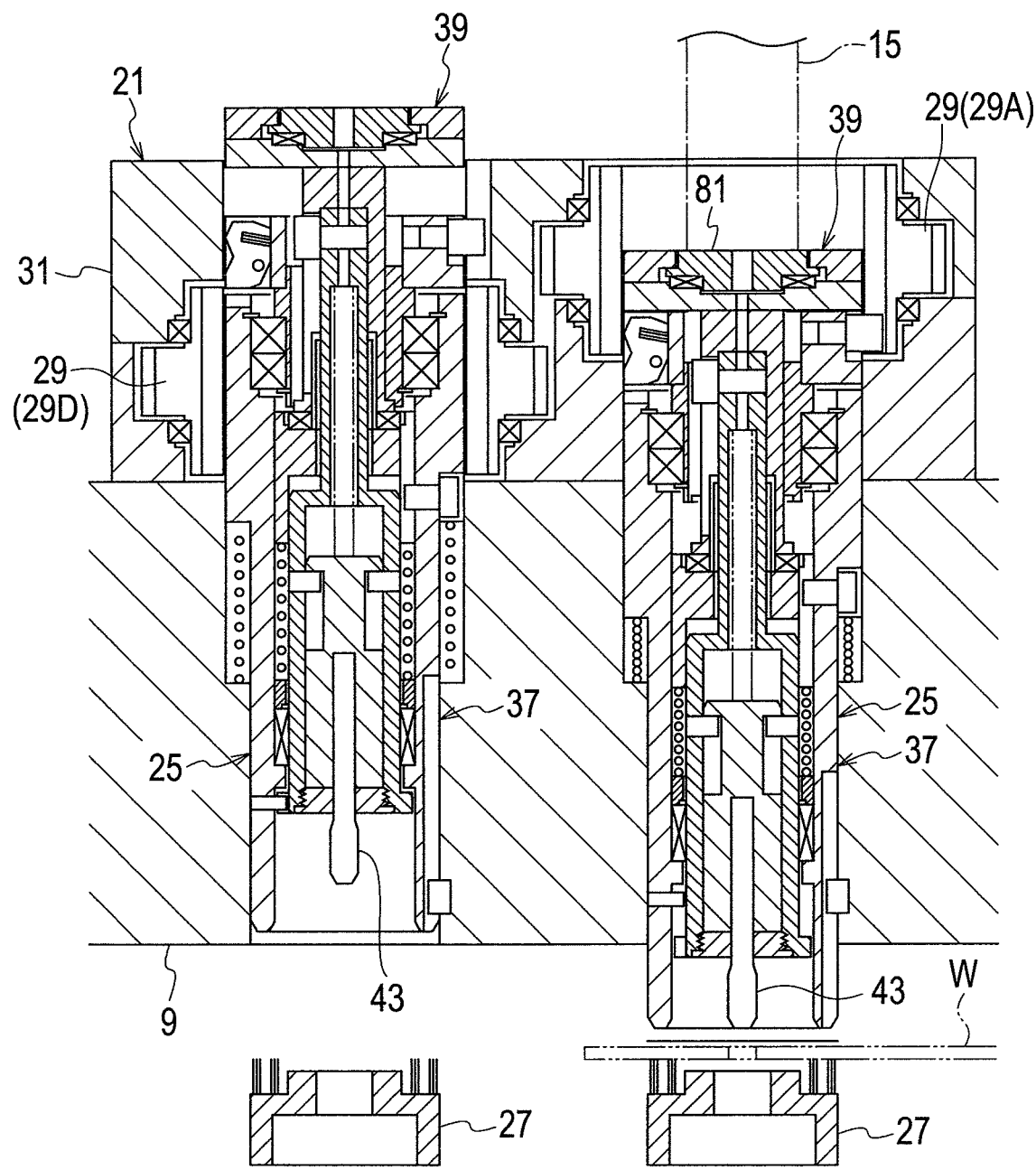
FIG. 12 is a view showing an operation of the turret punch press 1.

In the initial state, when the striker 15 of the turret punch press 1 descends under control of an unillustrated control device and presses down the rotating body 39 of the tapping tool 25 shown on the right side in FIG. 12, the lifter springs 59 and 65 are contracted, and the rotating body 39 of the tapping tool 25 on the right side descends as a consequence.

Figure 13:
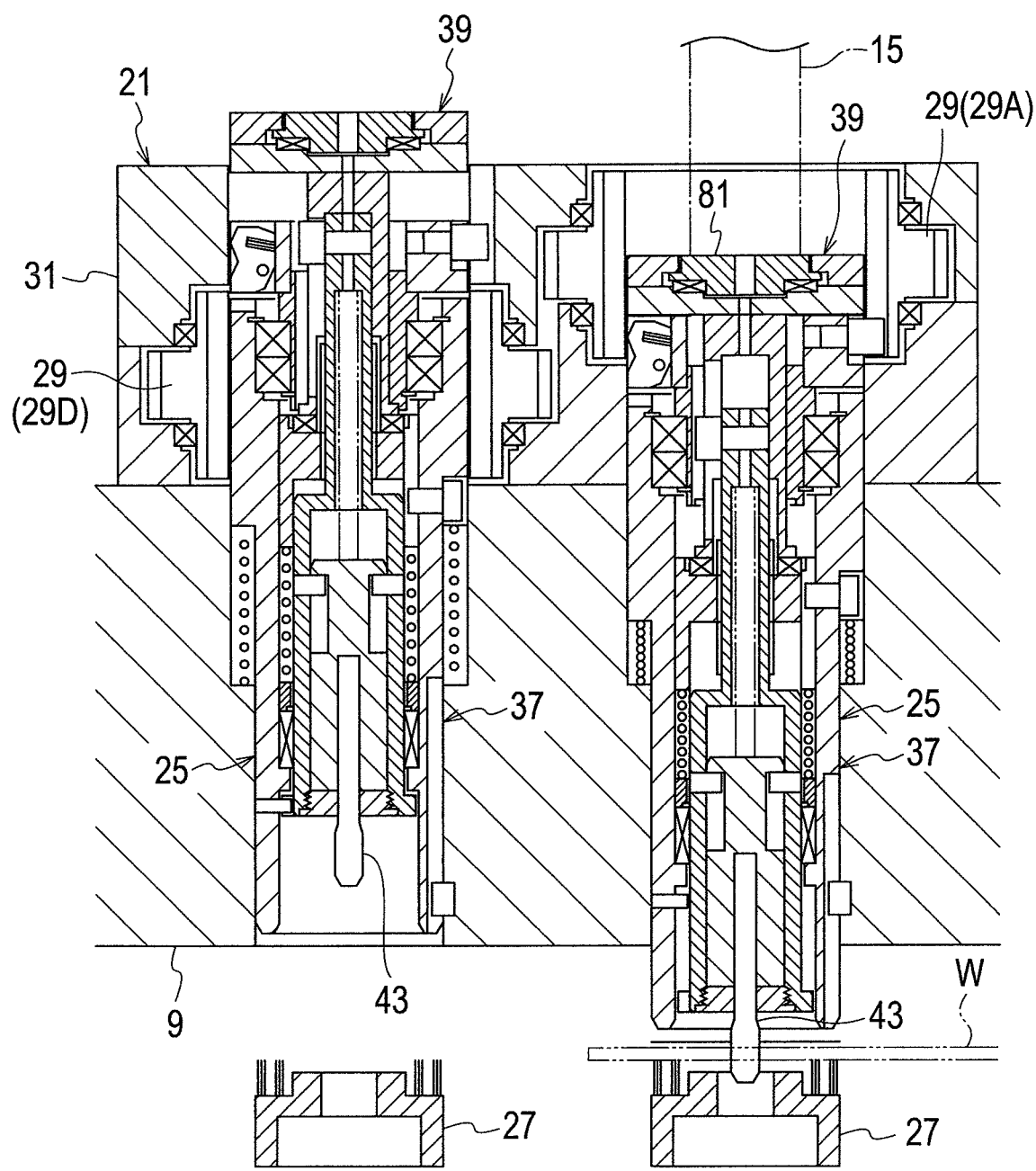
FIG. 13 is a view showing an operation of the turret punch press 1.

Subsequently, when the rotating body 39 is rotated by way of the adapter 23 for tapping-unit rotational drive, the lifer spring 65 is contracted and the tap 43 performs tapping on the workpiece W as shown on the right side in FIG. 13.

Thereafter, the rotating body 39 is inversely rotated by way of the adapter 23 for tapping-unit rotational drive to establishing the state shown in FIG. 12, and the workpiece W is moved and positioned to perform subsequent tapping. The subsequent tapping is carried out after this moving and positioning procedure.

Figure 14:
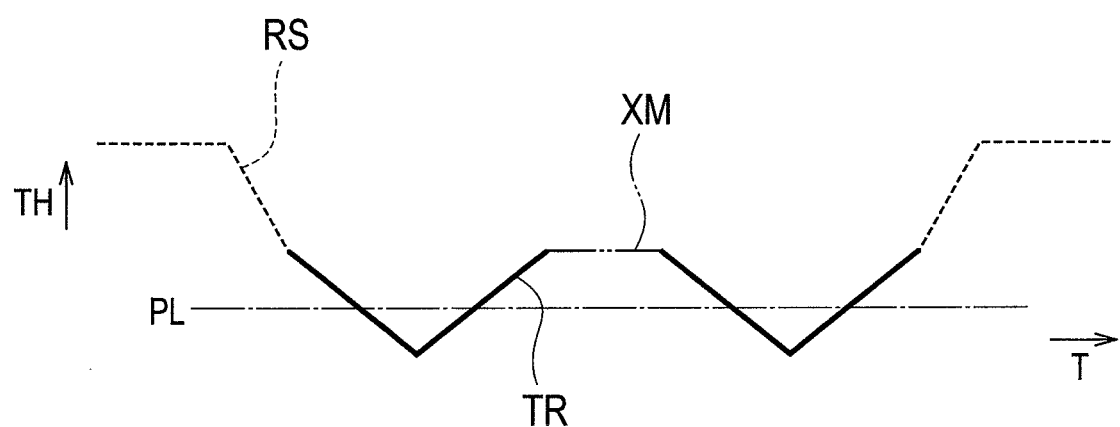
FIGS. 14(a) and 14(b) are views showing operations of the turret punch press 1.
Figure 14:
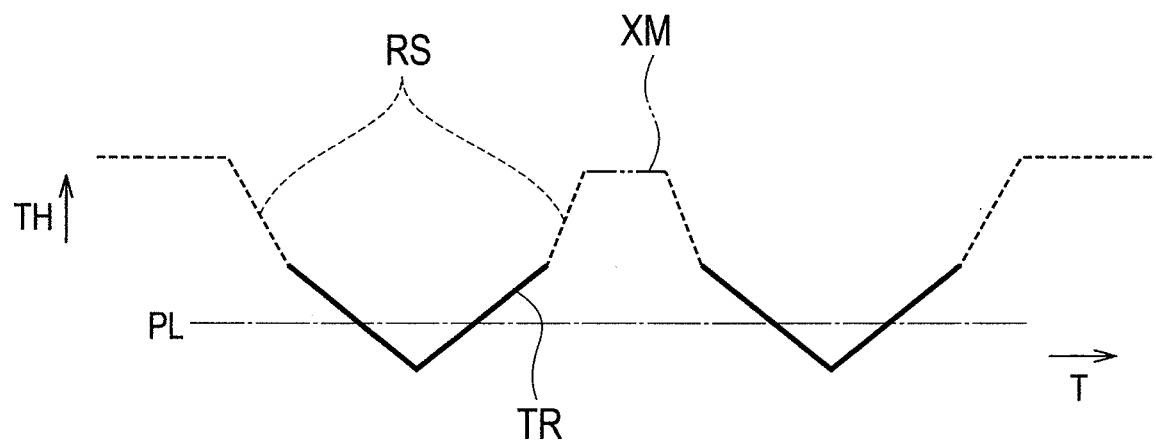
Figure 15:
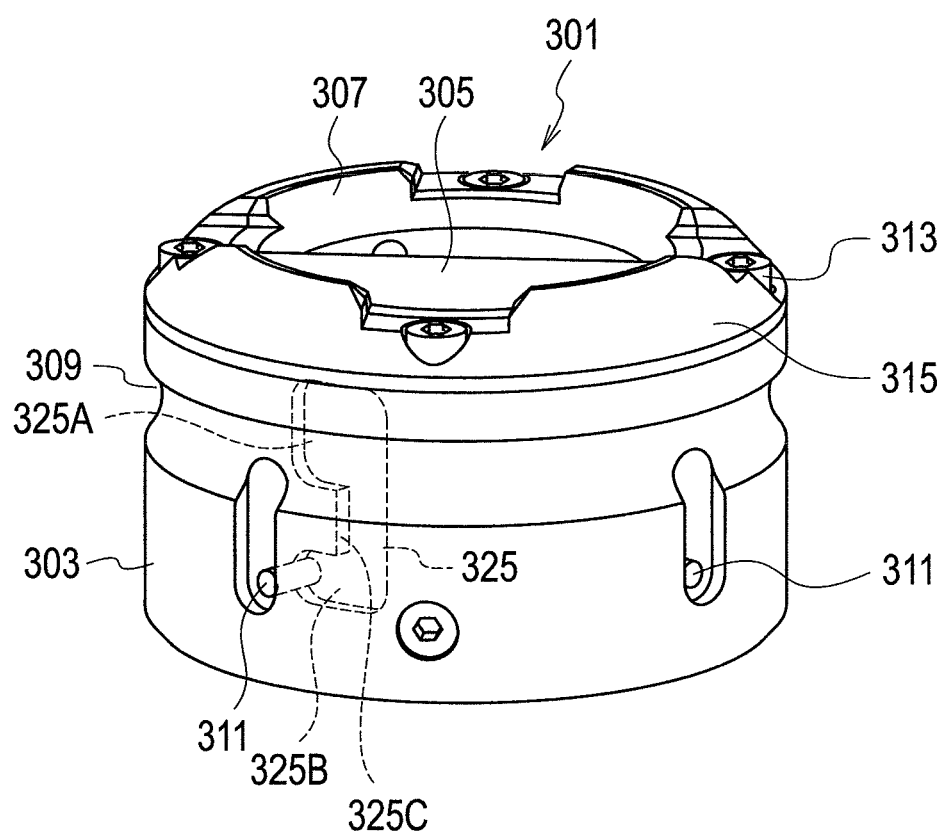
FIG. 15 is a perspective explanatory view of a tap die according to an embodiment of the present invention.
Figure 16:
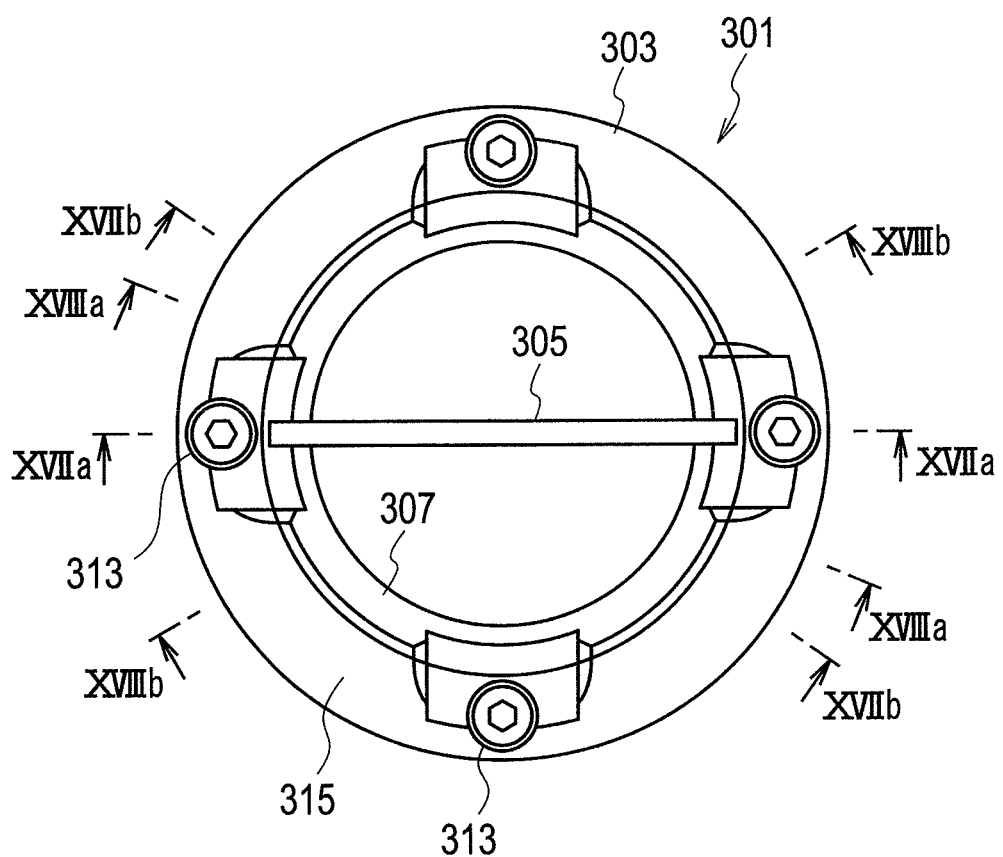
FIG. 16 is a plan explanatory view of the same.

The above-described operations are shown in a timechart in FIG. 14(*a*).

Here, in FIG. 14(*a*) and FIG. 14(*b*), PL denotes a pass line where the workpiece W travels, a vertical axis direction TH in the drawings denotes a tap height, a horizontal axis direction T in the drawings denotes time, RS denotes ram stroke, TR denotes tap rotation, and XM denotes axial movement.

Note that it is also possible to inversely rotate the rotating body 39 after performing one tapping to establish the state shown in FIG. 12, then to move the striker 15 of the turret punch press 1 upward to establish the state shown in FIG. 11, and thereafter to perform the subsequent tapping (see FIG. 14(*b*)).

The above-mentioned description of the operations exemplifies the case of performing tapping by using the tapping tool that is disposed in the ring gear 29A out of the four tapping tools. However, it is also possible to perform tapping on the workpiece W by using a different tapping tool 25 such as the tapping tool disposed in the ring gear 29D.

According to the turret punch press 1, it is possible to dispose the tapping tools 25 on the upper turret 9 and use the tapping tools 25 by disposing, on the upper turret 9, the adapter 21 for tapping that is mountable on the upper turret 9. Meanwhile, if the adapter 21 for tapping is detached from the upper turret 9, then it is possible to dispose punching tools on the upper turret 9 and use the punching tools. Hence, it is possible to handle various processes easily by using the single turret punch press 1.

Moreover, according to the adapter 21 for tapping, there are the regions where the ring gears 29 overlap one another. These overlapping regions enable the downsizing of the adapter 21 for tapping and thereby space saving can be achieved.

Incidentally, the adapter 21 for tapping is usable not only as the adapter dedicated for the tapping tools but also as the adapter for the punching tools.

Specifically, it is possible to handle various processes by detaching the adapter 21 for tapping and directly disposing the punching tools on the upper turret 9 as described above; instead of this, it is also possible to insert and dispose the punching tools into the adapter 21 for tapping in lieu of the tapping tools 25 without detaching the adapter 21 for tapping.

In this case (when the punching tools are inserted and disposed into this adapter 21 for tapping in lieu of the tapping tools 25), a rotative force is not transmitted to any of the punching tools by rotating the ring gears 29 because the punching tools are not provided with the pins 123 to be engaged with the key grooves 125 formed in the inner circumference of the ring gears 29. Hence, the punching tools can perform punching at predetermined angles and in predetermined tool shapes without being rotated.

Meanwhile, it is also possible to use the adapter 21 for tapping as the adapter for both of tapping and punching by inserting the tapping tools into two of the four stations of the adapter 21 for tapping and inserting the punching tools into the other two stations on the adapter 21 for tapping, so as to be able to handle various processes. Specifically, it is possible to dispose the tapping tools in some stations of the multiple stations on the adapter 21 for tapping and to insert the punching tools to some other stations thereof.

Meanwhile, since the rotating body 39 of the tapping tool 25 does not rotate in the state where the tapping tool 25 is taken out of the upper turret 9, it is not necessary to align a turning angle (a phase) of the rotating body 39 relative to the cylindrical body 37 of the tapping tool 25 when disposing the tapping tool 25 on the upper turret 9. Hence, it is possible to dispose the tapping tool 25 on the upper turret 9 easily.

Meanwhile, when the tapping tool 25 is mounted on the upper turret 9, the rotating body 39 of the tapping tool 25 and the tap 43 disposed on this rotating body 39 are electrically insulated from the upper turret 9. Accordingly, when performing, for example, tapping on the workpiece W, it is possible to detect contact of the tap 43 with the workpiece W by use of a touch sensor.

Next, a tap die based on the present invention which is used in cooperation with the tapping tool described in the above embodiment will is be described by using the drawings.

First, referring to FIG. 15 to FIG. 18(*b*), as similar to a general tap die, a tap die 301 according to the embodiment of the present invention includes a cylindrical die body 303 to be mounted in a detachably replaceable manner on a die holder (not shown) in the punch press. Moreover, an inner cylinder 307, which includes a tap contact member 305 to be pressed downward by the tap 43 being rotatably and vertically movably provided to the tap tool 25 (see FIG. 11), is located inside this tap body 3 so as to be vertically movable and to be biased upward.

To be more precise, the die body 303 is mounted in a detachably replaceable manner into a die mounting hole (not shown) provided to the die holder while retaining a tiny gap therebetween. A circumferential groove 309 corresponding to a communication port (not shown) that is open so as to communicate with the die mounting hole is formed in an outer circumferential surface of this die body 303. Moreover, an air supply port 311 communicating with the circumferential groove 309 and penetrating inward through the die body 303 are formed in multiple positions on the die body 303. The communication port (not shown) is connected to an air source (not shown) through a connecting path (not shown) and this connecting path is provided with a flow switch (not shown) representing an example of a fluid sensor for detecting presence and absence of an air flow.

The flow switch performs an ON operation when a large amount of air is flowing through the connecting path and performs an OFF operation when a large amount of air is not flowing through the connecting path. Note that the flow switch is so provided as not to perform the ON operation by presence of a small amount of an air flow that flows out of the tiny gap between the die mounting hole and the die body 303. Therefore, it is possible to detect whether or not a large amount of air is flowing through the connecting path, on the basis of the ON operation and the OFF operation of the flow switch. Note that the flow switch may be one with a publicly-known configuration and detailed description of the configuration of the flow switch will be omitted herein.

The inner cylinder 307 being vertically movably provided inside the die body 303 is so formed that its outside diameter is nearly equal to inside diameters of the die body 303 and a hold ring 315, which is detachably attached to an upper part of the die body 303 by use of fixtures 313 such as bolts, in order to prevent chips from coming into (entering) the gap between the die body 303 and the inner cylinder 307. Specifically, clearances among the die body 303, the hold ring 315, and the inner cylinder 307 are formed into tiny clearances so as to avoid entrance of chips. Moreover, an upper end (an upper surface) 307U of the inner cylinder 307 nearly coincides with an upper end (an upper surface) 315U of the hold ring 315 in a normal state.

Figure 18:
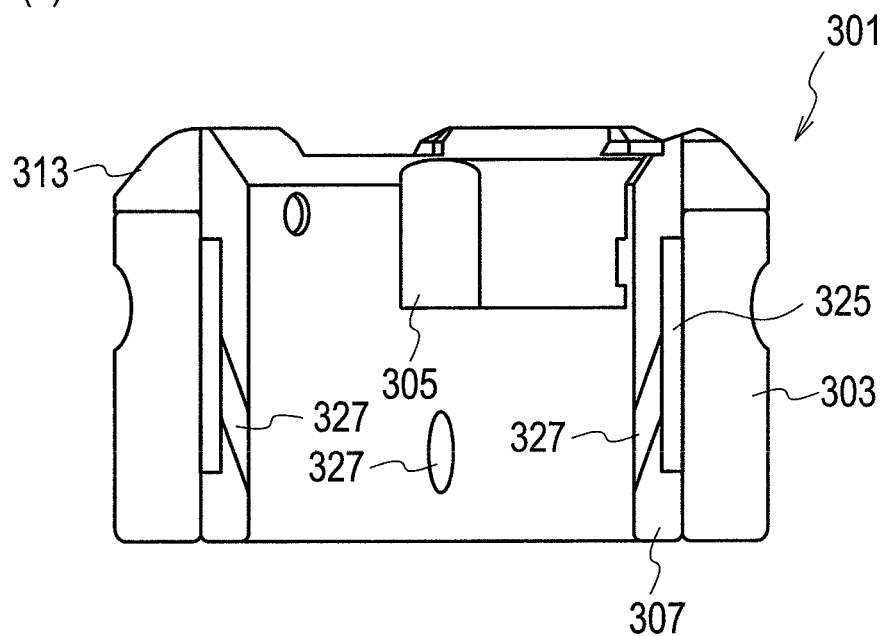
FIG. 18(a) is a cross-sectional explanatory view taken along a XVIIIa-XVIIIa line in FIG. 16
FIG. 18(b) is a cross-sectional explanatory view taken along a XVIIIb-XVIIIb line in FIG. 16.
Figure 18:
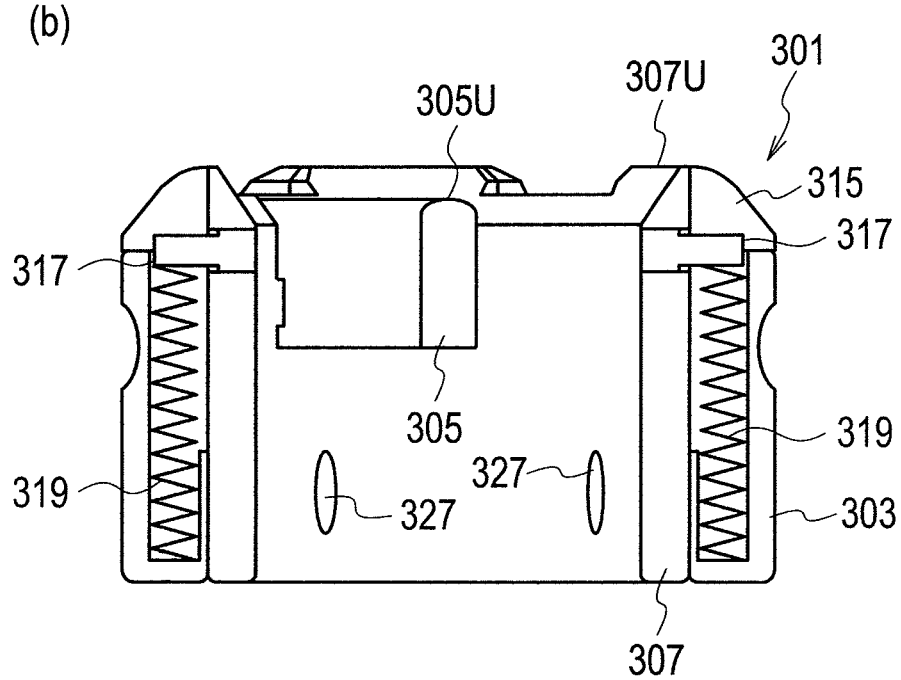

In order to bias the inner cylinder 307 always upward relative to the die body 303, an elastic member 319 such for example as a coil spring (see FIG. 18(*b*)) is elastically set between anti-rotation keys 317 provided in multiple positions on the inner cylinder 307 and a bottom part of the die body 303. Moreover, the anti-rotation keys 317 come into contact with a lower surface of the hold ring 315 to block detachment upward.

The tap contact member 305 is formed of a plate material which is elongated in an orthogonal direction to a shaft center of the inner cylinder 307 (a radial direction) and is attached to an upper end side of the inner cylinder 307. To be more precise, the tap contact member 305 is in a state where its protrusions on both ends are engaged with an engagement groove 321 formed radially in an upper part of the inner cylinder 307. The tap contact member 305 detachably attachable by locking screws 323 threadedly engaged with the inner cylinder 307 in the radial direction.

An upper surface 305U of the tap contact member 305 is provided at a lower position than the upper end 307U of the inner cylinder 307. Moreover, the upper surface 305U is formed into a curved surface whose both ends in the thickness direction of the tap contact member 305 are lower so that the chips can fall easily. Further, a width dimension of the tap contact member 305 in the vertical direction is set greater than the thickness dimension thereof in order to prevent chips from twining. To be more precise, the width dimension of the tap contact member 305 in the vertical direction is set to be several times to about dozen times as large as the thickness dimension thereof in order to prevent chips, which are generated in a long helical shape as a result of tapping with the tap provided to the tap tool, from twining or tangling.

Upper and lower communicating portions 325A and 325B communicatively connectable to and disconnectable from the air supply ports 311 provided to the die body 303 are provided in an outer circumferential surface of the inner cylinder 307. To be more precise, the communicating portions 325A and 325B are formed in the following manner: a concave portion 325 elongated in the vertical direction is formed in the outer circumferential surface of the inner cylinder 307 in regions corresponding to the air supply ports 311; and a tong-shaped land portion 325C serving as a convex portion is provided at an intermediate portion, in the vertical direction, of the concave portion 325 to thereby partition a portion located on one side of the concave portion 325 into the communicating portion 325A and the communicating portion 325B. Moreover, air ejection holes 327 (see FIG. 18(a)) directed downward are provided in an inner circumferential surface of the inner cylinder 307 so as to communicate with the concave portions 325.

According to this configuration, even in the configuration to partition the communicating portions 325A and 325B vertically, the air ejection port 327 is common due to the configuration in which the communicating portions 325A and 325B are provided to the one-side portions of the concave portion 325. Hence, it is possible to simplify the configuration.

Figure 17:
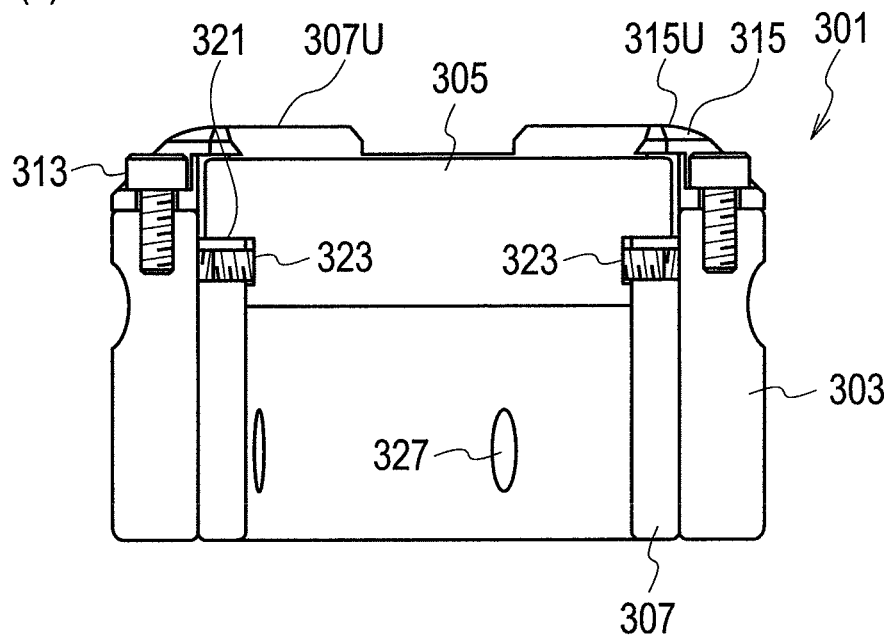
FIG. 17(a) is a cross-sectional explanatory view taken along a XVIIa-XVIIa line in FIG. 16
FIG. 17(b) is a cross-sectional explanatory view taken along a XVIIb-XVIIb line in FIG. 16.
Figure 17:
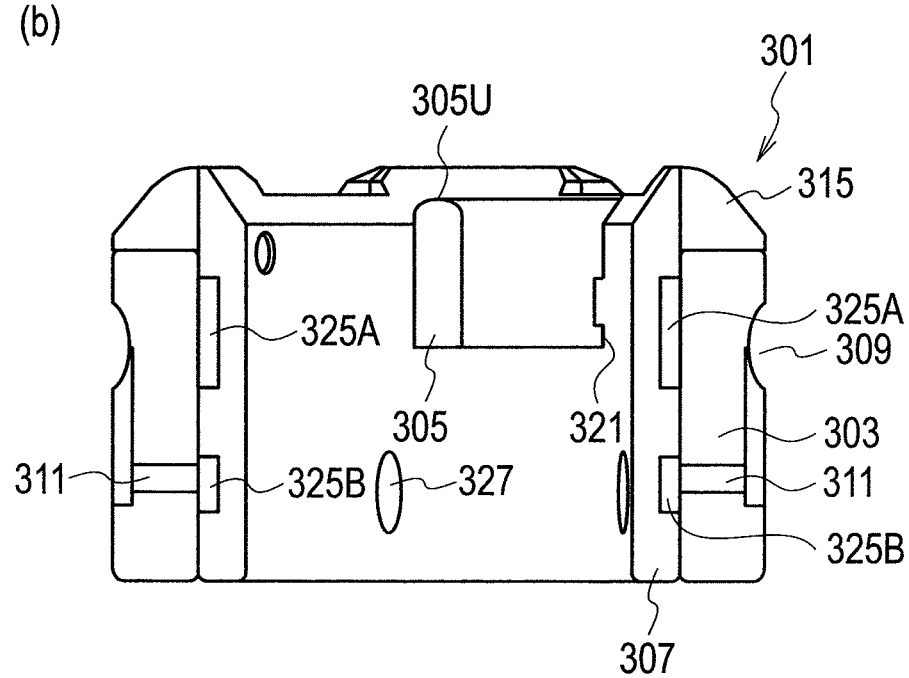

In the above-described configuration, in the state where the tap die 301 is mounted into the die mounting hole of the die holder provided to the punch press, the inner cylinder 307 is in the state of being lifted to the uppermost position by the biasing force of the elastic member 319 as shown in FIG. 17(a) to FIG. 18(b). The upper end (the upper surface) 307U of the inner cylinder 307 is in the state of nearly coinciding with the upper end of the die body 303, i.e., the upper end (the upper surface) 315U of the hold ring 315. Moreover, the air supply ports 311 provided to the die body 303 are in the state of communicating with the communicating portions 325B on the lower side of the concave portions 325 formed in the outer circumferential surface of the inner cylinder 307 as shown in FIGS. 17(a) and 17(b).

Accordingly, the air supplied from the air source is directed and ejected from the air ejection holes 327 provided to the inner cylinder 307 in the downward direction into the inner cylinder 307, thereby causing an action to suction the air from the upper part of the inner cylinder 307 into the inner cylinder 307. Meanwhile, the flow switch serving as the fluid sensor provided to the connecting path connected to the air source is in the ON-operation state.

A pilot hole in the workpiece is positioned above the tap die 301 when the inner cylinder 307 is in the state of being lifted to the uppermost position as described above. Then, the tap tool is moved down to a predetermined height position by use of the ram (the striker) provided to the punch press in order to perform tapping on this pilot hole. After the workpiece is pressed and fixed to the upper surface of the hold ring 315 on the tap die 301 by using this tap tool or while maintaining the tap tool in a state of being slightly separated from the workpiece, the tap provided to the tap tool is rotated and moved downward. As a result, the tapping is performed on the pilot hole in the workpiece with the tap as similar to a conventional typical tap tool.

Figure 19:
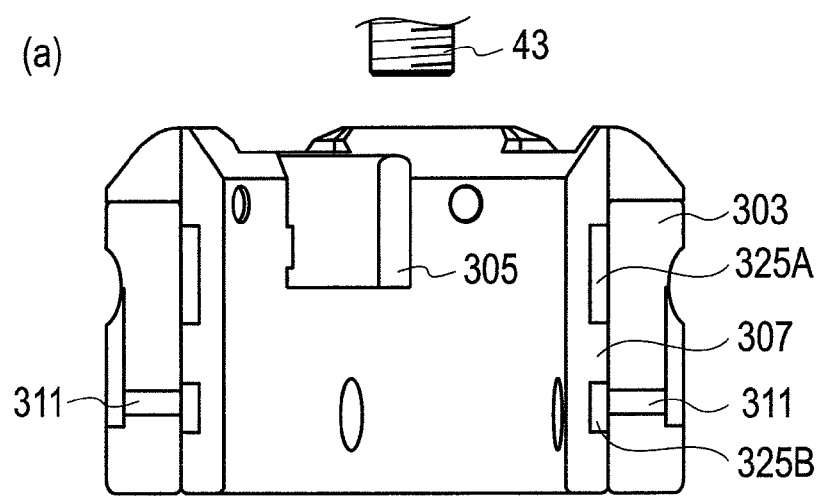
FIGS. 19(a), 19(b), and 19(c) are operation explanatory views of the tap die.
Figure 19:
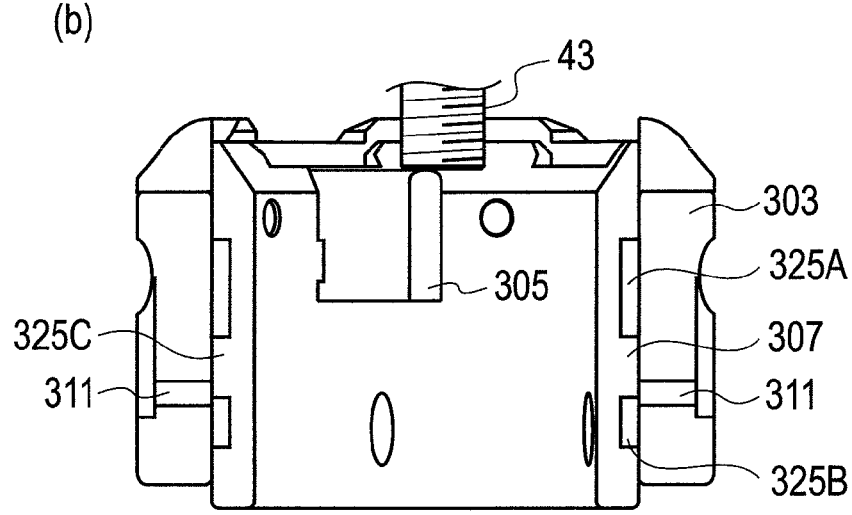
Figure 19:
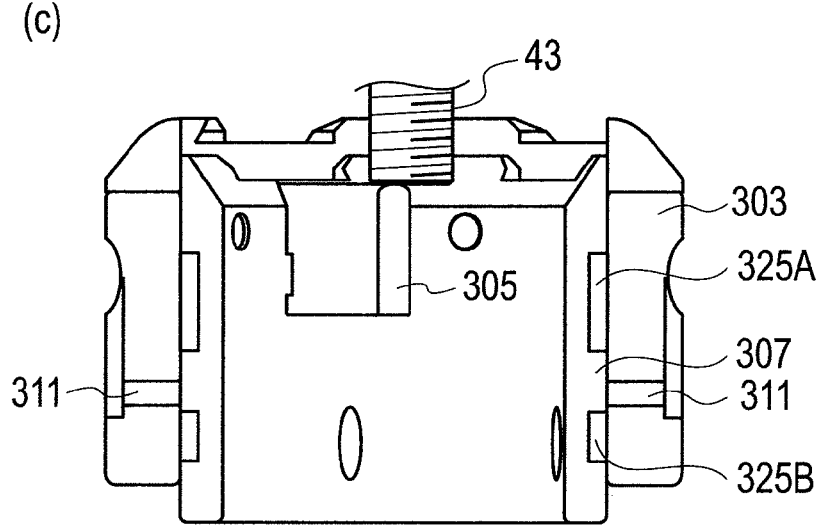
Figure 20:
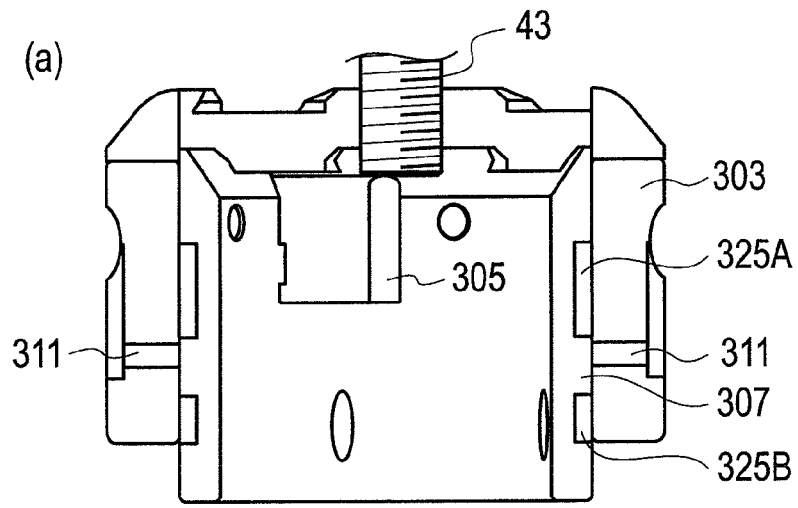
FIGS. 20(a), 20(b), and 20(c) are operation explanatory views of the tap die.
Figure 20:
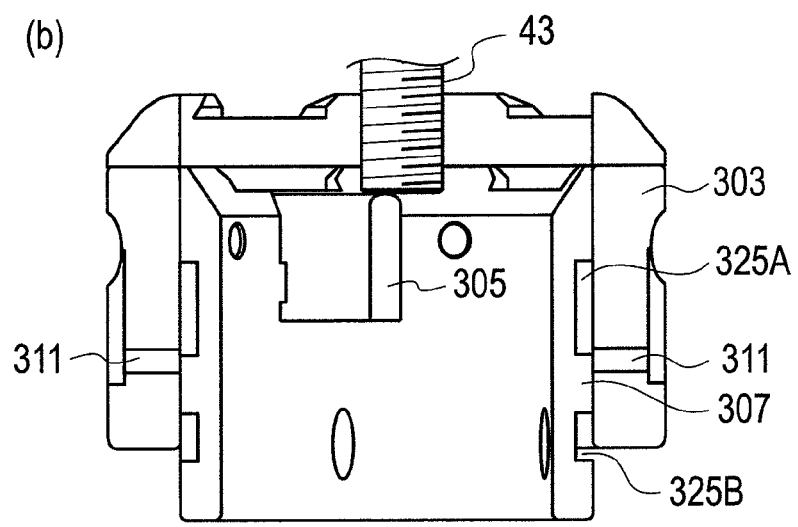
Figure 20:
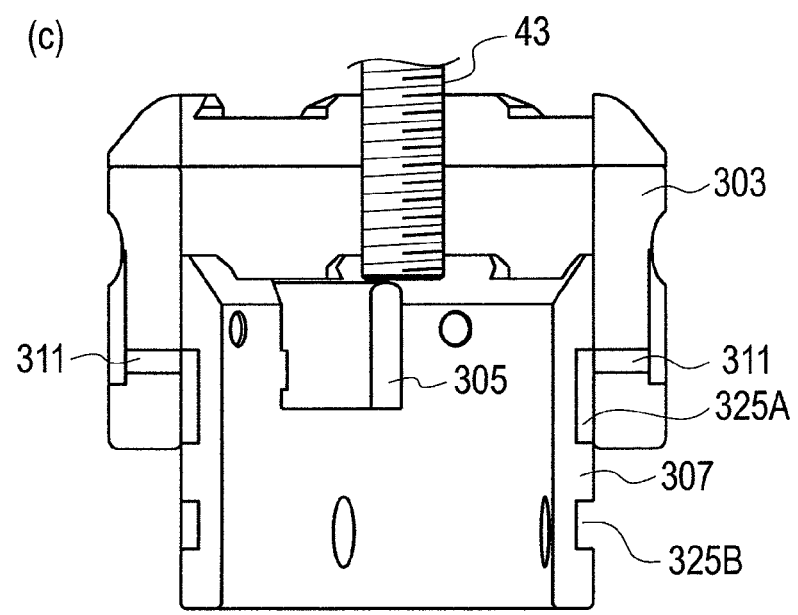

In performing the tapping on the pilot hole in the workpiece as described above, as a lower end of the tap 43 comes into contact with the tap contact member 305, the inner cylinder 307 is moved down gradually against the biasing force of the elastic member 319 as shown in FIGS. 19(b) and 19(c) (note that illustration of the workpiece is omitted in FIG. 19(a) to FIG. 20(b)). Then, the state of communication between the lower communicating portion 325B formed in the outer circumferential surface of the inner cylinder 307 and the air supply port 311 provided to the die body 303 is gradually interrupted. That is, the communication is blocked when the air supply port 311 faces the land portion 325C.

As described above, when the air supply port 311 provided to the die body 303 is in the state of facing the land portion 325C of the inner cylinder 307 and there is built a state where the communication is blocked because of the air supply portion 311 facing the land portion 325C, the ram provided vertically movably to the punch press is in the state of descending to a predetermined descending position, while the tap provided to the tapping tool is in the state of being rotated by a preset number of revolutions and descending from a predetermined height position by a prescribed stroke length in light of a relation between the number of revolutions and the pitch of the tap. Specifically, this is the moment when the tap 43 and the inner cylinder 307 descend to the lowest positions by the prescribed stroke length. After the tap 43 descends to the lowest position as described above, the tap 43 is inversely rotated and the ram is lifted up, thereby completing the tapping on the pilot hole in the workpiece.

Therefore, if the flow switch serving as the fluid sensor performs ON-OFF-ON operations when the tap 43 is changed from positive rotation to negative rotation to be lifted up from the lowest descending position, it is possible to detect that the tapping is normally performed. Here, when the flow switch does not shift to the OFF state but continues the ON state even if the tap 43 is allowed to descend along with positive rotation, then it is possible to detect that the tap has not come into contact with the tap contact member 305. Through such detection, it is possible to detect that the tap is broken, that the tap tool is not provided with the tap, or that the tap is shorter than the prescribed length.

Meanwhile, at the time of operations in which the flow switch shows the ON, OFF, and OFF states when the tap 43 operates with positive rotation and negative rotation, it is possible to detect that the tap is in a descending state. Specifically, in this case, it is possible to detect that the tap is maintaining its position without being detached upward from the workpiece.

Further, at the time of operations in which the flow switch shows the OFF, OFF, and OFF states when the tap 43 operates with positive rotation and negative rotation, it is possible to detect that the inner cylinder 307 has already reached the descending state and is in a state of a sliding failure.

Moreover, if the state of the flow switch is changed as ON, OFF, and ON when the tap 43 descends along with positive rotation, it is possible to detect that the tap provided to the tap tool is the tap having a larger diameter than that of a prescribed tap, or that the length of the tap is longer than the prescribed length. Specifically, if the tap 43 descends from the state shown in FIG. 19(a) to press down the tap contact member 305, the air supply ports 311 provided to the die body 303 are in the blocked state by the land portion 325C of the inner cylinder 307, and the flow switch is in the OFF operation state in cases of the states of FIG. 19(c) and FIG. 20(a). If the tap 43 further descends from this state to the lowest descending position, the inner cylinder 307 descends further by the tap 43. The upper communication portion 325A in the concave portion 325 formed in the outer circumferential surface of the inner cylinder 307 communicates with the air supply port 311 provided to the die body 303, whereby the flow switch is set to the ON state.

Therefore, if the flow switch performs the ON, OFF, and ON operations at the time of descending action of the tap, it is possible to detect such operations as overstroke of the tap. Accordingly, in this case, it is appropriate to replace the tap tool with another tap tool provided with the prescribed tap or to replace the tap with another tap having the prescribed length.

As described previously, chips generated by performing tapping on the pilot hole in the workpiece fall into the inner cylinder 307. In this case, some of the chips tend to remain on the upper surface 305U of the tap contact member 305. However, since the upper surface 305U is formed into the curved surface whose both ends in the thickness direction of the tap contact member 305 are lower. Accordingly, the chips fall without remaining on the upper surface 305U. Meanwhile, chips having relatively long helical shapes tend to twine and tangle around the tap contact member 305. However, since the width dimension of the tap contact member 305 in the vertical direction is formed into a width dimension large enough to avoid the chips from twining and tangling. Hence, it is possible to prevent the chips from twining and tangling around the tap contact member 305.

Furthermore, the inner cylinder 307 is so formed that its outside diameter is nearly equal to the inside diameter of the tap body 303. Moreover, in the normal state, the upper end (the upper surface) 307U of the inner cylinder 307 is retained in the state of nearly coinciding with the upper end of the tap body, i.e., the upper end (the upper surface) 315U of the hold ring 315. Therefore, it is possible to perform vertical movement of the inner cylinder 307 relative to the tap body 303 always smoothly while preventing chips from entering the gap between the tap body 303 and the inner cylinder 307.

As it is understood from the description given above, the tap die 301 according to this embodiment improves a discharge performance of chips generated at the time of tapping, whereby smooth vertical movement of the inner cylinder 307 relative to the die body 303 will not be disturbed. Moreover, it is possible to detect the state of air supply into the inner cylinder 307 of the tap die 301 with the fluid sensor, and to cause the fluid sensor to perform the ON, OFF, and ON operations when the inner cylinder 307 descends by way of the tap of the punch press. Hence, it is possible to detect overstoke of the tap easily.

Moreover, since the fluid sensor is formed of the flow switch that detects the air flow inside the connecting path, it is possible to detect the air flow accurately without being affected by pressure fluctuation unlike a pressure switch. Hence it is possible to accurately detect communicative connection to or disconnection from the air supply ports 311 provided to the die body 303.

The entire contents of Japanese Patent Application No. 2008-178029 (filed on Jul. 8, 2008), Japanese Patent Application No. 2008-238289 (filed on Sep. 17, 2008), and Japanese Patent Application No. 2008-238293 (filed on Sep. 17, 2008) are incorporated herein by reference.

The present invention is not limited only to the above description of the embodiment of the invention but can be embodied in various other forms by applying appropriate modifications.

The invention claimed is:

1. An adapter for tapping used in a turret punch press, comprising:
   a ring gear provided with a columnar through-hole at a central part of the ring gear; and
   a gear holder in which the ring gear is rotatably disposed and the gear holder is mountable on a turret of the turret punch press so as to locate the disposed ring gear at a position corresponding to a punch mounting section formed in advance in the turret of the turret punch press, wherein
   when a tapping tool is inserted into the columnar through-hole of the ring gear, the tapping tool is slidably moved in a longitudinal direction of the tapping tool in the columnar through-hole of the ring gear, wherein
   at least two ring gears are disposed, each of the ring gears is formed with a tooth portion at a peripheral portion of the each of the ring gears so that the tooth portion surrounds the columnar through-hole of the ring gear,
   each of the tooth portions of the ring gears are separated from each other in an extending direction of central axes of rotation of the respective ring,
   the tooth portion of one ring gear among the ring gears partially overlaps with the other tooth portion of the other one ring gear among ring gears when viewed in the extending direction of the central axes of rotation of the ring gears, and
   the gear holder is provided with an intermediate gear meshed with the ring gears.

* * * * *